United States Patent
Redpath

(10) Patent No.: US 10,158,631 B2
(45) Date of Patent: *Dec. 18, 2018

(54) DIGITAL IDENTITY CARD MANAGEMENT

(71) Applicant: International Business Machines Corporation, Armonk, NY (US)

(72) Inventor: Richard Redpath, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/478,657

(22) Filed: Apr. 4, 2017

(65) Prior Publication Data
US 2018/0115545 A1 Apr. 26, 2018

Related U.S. Application Data

(63) Continuation of application No. 15/298,672, filed on Oct. 20, 2016.

(51) Int. Cl.
*H04L 29/00* (2006.01)
*H04L 29/06* (2006.01)
(Continued)

(52) U.S. Cl.
CPC ........ *H04L 63/0853* (2013.01); *G06F 3/0482* (2013.01); *G06F 3/04817* (2013.01);
(Continued)

(58) Field of Classification Search
CPC ................ G06T 1/0071; G06T 1/0085; G06T 2201/0062; H04N 1/32299; H04N 1/32304

See application file for complete search history.

(56) References Cited

U.S. PATENT DOCUMENTS 8,775,243 B2 7/2014 Gillenson et al.
2006/0293904 A1 12/2006 Ramanathan et al.
(Continued)

FOREIGN PATENT DOCUMENTS

WO 2008047118 A2 4/2008

OTHER PUBLICATIONS

Defurio, Lori, "Designing forms for auto field detection in Adobe® Acrobat", Adobe Acrobat 9, Technical White Paper, 91022956 2/10, Feb. 17, 2010, © 2010 Adobe Systems Incorporated, 7 pages.
(Continued)

*Primary Examiner* — Ghazal B Shehni
(74) *Attorney, Agent, or Firm* — Brian M. Restauro

(57) ABSTRACT

Embodiments of the present invention provide methods, program products and systems to reduce mistakes in production and management of digital identification cards. Embodiments of the present invention can create a digital card template design using graphical icons in a user interface display and publish the created digital card template design to a server. Embodiments of the present invention can access the server to test the published digital card template design using sample data and deploy the published digital card template design to an issuing service. Embodiments of the present invention can, responsive to receiving an acquisition URL from the issuing service, build an instance of a digital identification card from information included in the acquisition URL.

20 Claims, 21 Drawing Sheets

(51) Int. Cl.

| | |
|---|---|
| *G06F 21/34* | (2013.01) |
| *G06F 3/0481* | (2013.01) |
| *G06F 17/24* | (2006.01) |
| *H04L 29/12* | (2006.01) |
| *G06F 3/0482* | (2013.01) |
| *G06F 21/33* | (2013.01) |
| *G06Q 20/34* | (2012.01) |
| *G06K 19/077* | (2006.01) |

(52) U.S. Cl.
CPC ............ *G06F 17/248* (2013.01); *G06F 21/33* (2013.01); *G06F 21/34* (2013.01); *G06K 19/07749* (2013.01); *G06Q 20/355* (2013.01); *H04L 61/20* (2013.01); *H04L 61/6004* (2013.01)

(56) References Cited

U.S. PATENT DOCUMENTS

| | | | |
|---|---|---|---|
| 2008/0016565 | A1 | 1/2008 | Mushing |
| 2015/0063625 | A1* | 3/2015 | Martin ............... H04N 1/32325 382/100 |
| 2016/0188547 | A1* | 6/2016 | Cruzada ................ G06F 17/211 715/749 |
| 2017/0302455 | A1 | 10/2017 | Abt, Jr. et al. |

OTHER PUBLICATIONS

IBM, "Cancelable Biometric Loyalty Template Services", An IP.com Prior Art Database Technical Disclosure, IP.com No. IPCOM000178052D, Jan. 14, 2009, 3 pages.

Kapoor, Rohan, "30+ Free Branding/Identity & Stationery PSD Mockups", Fusionplate.com, Nov. 6, 2014, 45 pages, <http://www.fusionplate.com/3014/free-brandingidentity-stationery-psd-mockups/>.

Mell et al., "The NIST Definition of Cloud Computing", U.S. Department of Commerce, National Institute of Standards and Technology, Special Publication 800-145, Gaithersburg, MD, Sep. 2011, 7 pages.

Mitchell, Kirk, "Software glitch sends regular Colorado driver's licenses to immigrants", The Denver Post, Posted: Sep. 12, 2014 01:36:01 PM MDT, 4 pages, <http://www.denverpost.com/news/ci_26521997/error-invalidates-drivers-licenses-immigrants-here-illegally>.

"Branding HTML Example", IBM Mobile Identity, Tutorials, © IBM Corp. 2015-2016, 1 minute and 16 seconds, 1 page, <http://mi.ibmjstart.com/>.

"Branding Kit User Guide", IBM Mobile Identity, Nov. 19, 2015, 2:58 PM, On Post Disclosure Information for END8-2015-0753 created by R Redpath on Nov. 23, 2015 09:35:48 AM CST, pp. 8-44.

"Customize Credit Cards With Personalized Photos", Capital One, Accessed on Mar. 30, 2016 4:31 PM, On Post Disclosure Information for END8-2015-0753 created by William H Hartwell on Mar. 4, 2016 08:15:21 AM CST, © 2016 Capital One, 2 pages, <https://www.capitalone.com/Credit-cards/benefits/personalize/>.

"Deluxe Corp-Home page", Orderpoint.deluxe.com/personal-checks, Accessed on Mar. 30, 2016 4:22 PM, On Post Disclosure Information for END8-2015-0753 created by William H Hartwell on Mar. 4, 2016 08:15:21 AM CST, 2 pages, <https://orderpoint.deluxe.com/personal-checks/home.htm>.

"Design a Card", Premier Plastic Cards, Accessed on Mar. 30, 2016 4:33 PM, On Post Disclosure Information for END8-2015-0753 created by William H Hartwell on Mar. 4, 2016 08:15:21 AM CST, 1 page, <http://premierplasticcards.co.uk/design_card.php#wizard/color>.

"Master Card Brand Center", MasterCard, Accessed on Mar. 30, 2016 4:36 PM, On Post Disclosure Information for END8-2015-0753 created by William H Hartwell on Mar. 4, 2016 08:15:21 AM CST,© 1994-2015 MasterCard, 1 page, <http://www.mastercardbrandcenter.com/us/index.shtml>.

Grace Period Disclosure, "Mobile Identity", IBM Mobile Identity, publicly available Aug. 5, 2015, © IBM Corp. 2015, 5 pages, <http://centralserver.mi-project.org:9280/>.

"Vehicle identification system using multiple NFC and Smart ID cards to validate authorization of the vehicle", An Ip.com Prior Art Database Technical Disclosure, IP.com No. IPCOM000240995D, IP.com Electronic Publication Date: Mar. 17, 2015, 8 pages.

Redpath, Richard, "Digital Identity Card Management", U.S. Appl. No. 15/298,672, filed Oct. 20, 2016, 34 pages.

Appendix P—List of IBM Patents or Patent Applications Treated as Related, Filed herewith, 2 Pages.

\* cited by examiner

FIG. 7

| id | posX | posY | fontid | eg: |
|---|---|---|---|---|
| iso09 | 246 | 150 | small | C |
| iso16 | 227 | 202 | small | 56 |
| iso17 | 282 | 202 | small | 124 |
| iso04d | 209 | 126 | large | 998-45-78 |
| iso08 | 50 | 251 | medium | 108 Main Street\nASPEN, CO 80203 |
| iso15 | 441 | 199 | small | F |
| iso18 | 356 | 200 | small | BR |
| iso03 | 368 | 166 | small | 2/24/1983 |
| iso04b | 368 | 131 | small | 2/24/2016 |
| iso04a | 368 | 149 | small | 2/24/2014 |
| iso03 | 51 | 233 | medium | Holly Smith |

FIG. 9B

DIGITAL IDENTITY CARD MANAGEMENT

BACKGROUND

The present invention relates generally to the field of digital identification cards, and more particularly to the management of digital identification cards.

Identity documents, are generally any documents that may be used to identify a person or verify aspects of a person's personal identity. Examples of identity cards can include driver licenses, fishing licenses, membership cards, passports, and credit cards. In recent years, identity documents have gone digital, that is, these identity documents are becoming available electronically. For example, users can now store membership cards, such as gym memberships, electronically on their mobile devices to scan and gain entry to their respective gyms.

SUMMARY

Embodiments of the present invention provide methods, program products and systems to reduce mistakes in production and management of digital identification cards. In one embodiment of the present invention, a method is provide comprising: creating a digital card template design using graphical icons in a user interface display; publishing the created digital card template design to a server; accessing the server to test the published digital card template design using sample data to populate respective data fields of the digital card template design; deploying the published digital card template design to an issuing service; and responsive to receiving an acquisition URL from the issuing service, building an instance of a digital identification card from information included in the acquisition URL.

BRIEF DESCRIPTION OF THE DRAWINGS

FIG. 7 is an example screenshot of a testing interface, in accordance with an embodiment of the present invention;

FIGS. 9A and 9B are example screenshots screenshot of editing text elements such as a multi-line field, in accordance with an embodiment of the present invention.

DETAILED DESCRIPTION

Figure 1:
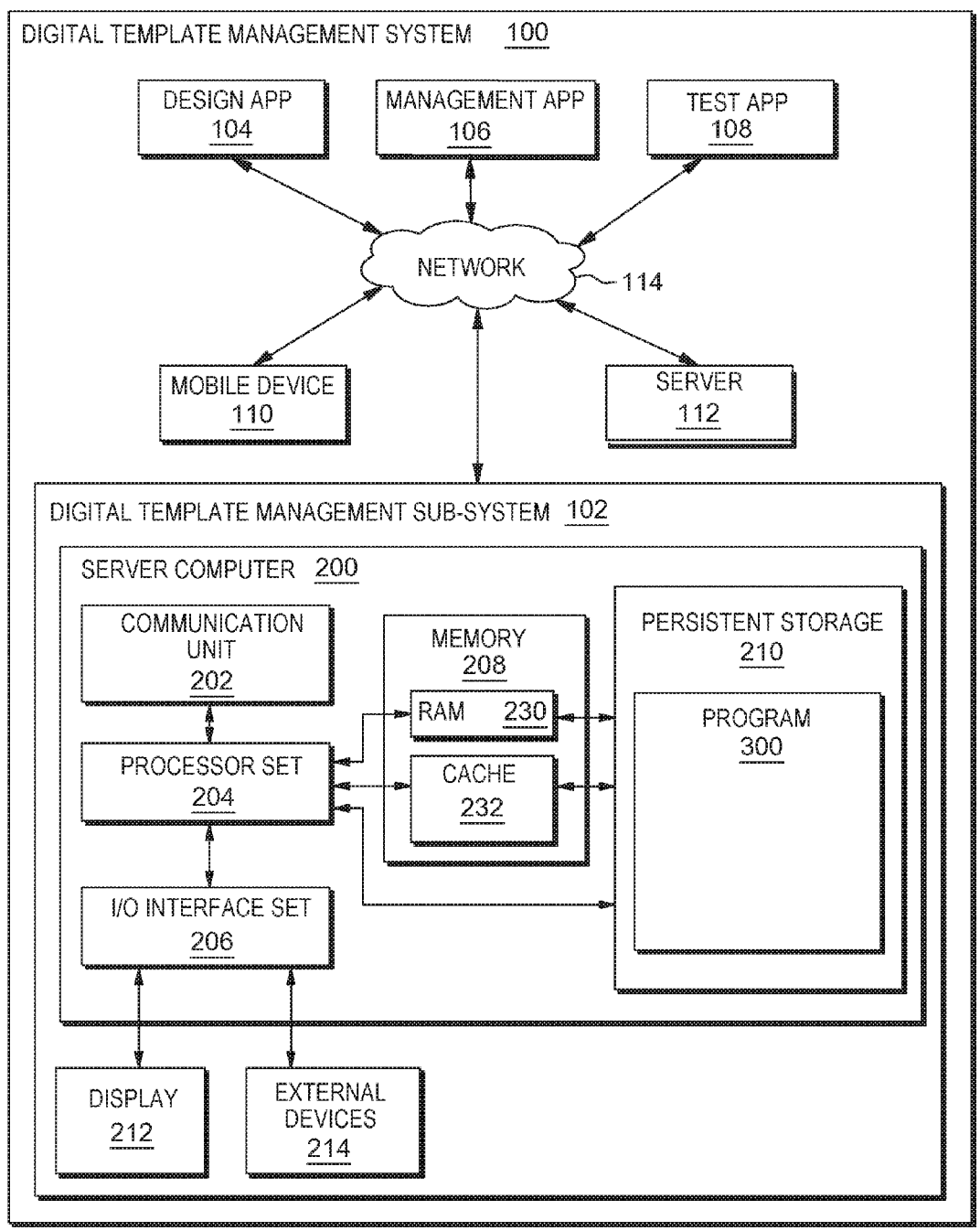
FIG. 1 is a block diagram view of a first embodiment of a system, in accordance with an embodiment of the present invention.

Embodiments of the present invention recognize that identity documents are brute force created from accessed data and printed using an IT service to update websites. In some instances, programs used to create documents can mistakenly issue identity documents with false credentials. For example, a mistake in the production process can select a driver license marked with no restrictions to persons who are not entitled to those privileges (e.g., persons having suspended licenses, under age drivers, etc.). Embodiments of the present invention provide solutions for reducing mistakes in production and management of digital identification cards by providing interfaces for design, test, and deployment. In this manner, as described in greater detail later in the specification, embodiments of the present invention can be used to create digital identity card template designs and enable multiple users in the design, test, and distribution process (e.g., users that design and create digital identity cards, users that review those digital identity cards for proper clearance, and users that manufacture those digital identity documents) to access and manage these digital identity card templates.

Furthermore, embodiments of the present invention provide end to end management of these digital identity documents. In this manner, as discussed in greater detail later in this specification, embodiments of the present invention can be integrated in a Point of Sale (POS) system to receive customer information (e.g., information associated with a customer applying for a license, such as date of birth, status, etc.), select an appropriate digital card template design based on the received customer information, and populate the digital identity card templates with the received customer information.

This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of digital template management system 100, including: digital template management sub system 102; design app 104, management app 106; test app 108; server 112; communication network 114; server computer 200; communication unit 202; processor set 204; input/output (I/O) interface set 206; memory device 208; persistent storage device 210; display device 212; external device set 214; random access memory (RAM) devices 230; cache memory device 232; and program 300. For illustrative purposes, the following discussion is made with respect to design app 104, management app 106, test app, 108, mobile device 110, and server 112 as being on separate systems. However, it should be understood that one or more components of digital template management system 100 can reside on the same system.

Digital template management sub system 102 is, in many respects, representative of the various computer sub-system(s) in the present invention. Accordingly, several portions of sub-system 102 will now be discussed in the following paragraphs.

Digital template management sub system 102 may be a laptop computer, tablet computer, netbook computer, personal computer (PC), a desktop computer, a personal digital assistant (PDA), a smart phone, or any programmable electronic device capable of communicating with the client sub-systems via communication network 114.

Figure 3:
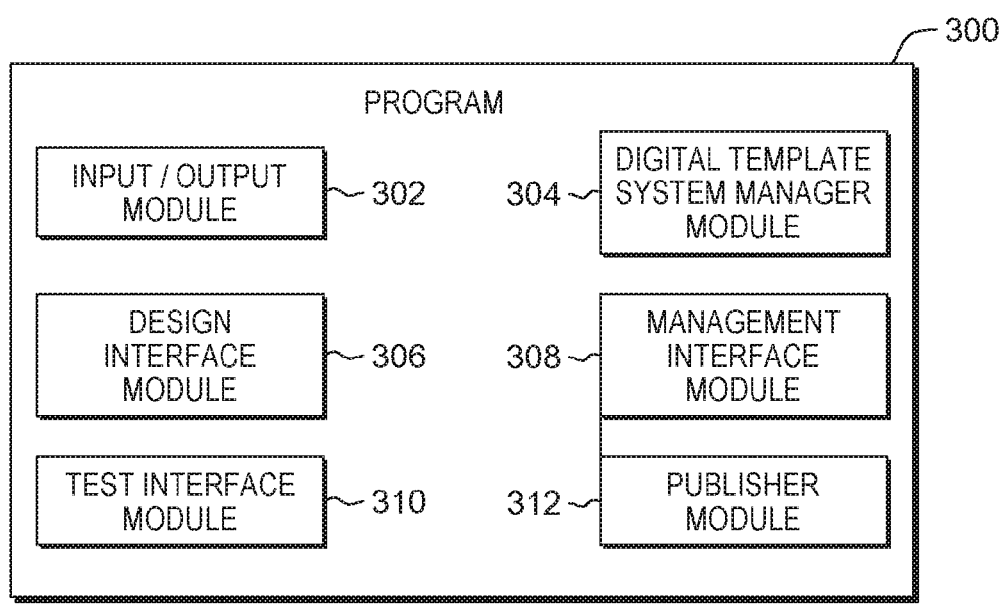
FIG. 3 is a block diagram showing a machine logic (for example, software), in accordance with an embodiment of the present invention.

Program 300 includes input/output module 302, digital template system manager module 304, design interface module 306, management interface module 308, test interface module 310, and publisher module 312, as shown and described in FIG. 3. In general, program 300 is a collection of machine readable instructions and/or data that is used to create, manage, and control certain software functions that will be discussed in detail, below, in the Example Embodiment sub-section of this Detailed Description section.

Digital template management sub system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Digital template management sub system 102 is shown as a block diagram with many double arrows. These double arrows (no separate reference numerals) represent a communications fabric, which provides communications between various components of digital template management sub system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory device 208 and persistent storage device 210 are computer-readable storage media. In general, memory 208 can include any suitable volatile or non-volatile computer-readable storage media. It is further noted that, now and/or in the near future: (i) external device(s) 214 may be able to supply, some or all, memory for digital template management sub system 102; and/or (ii) devices external to digital template management sub system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communication unit 202, in these examples, provide for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
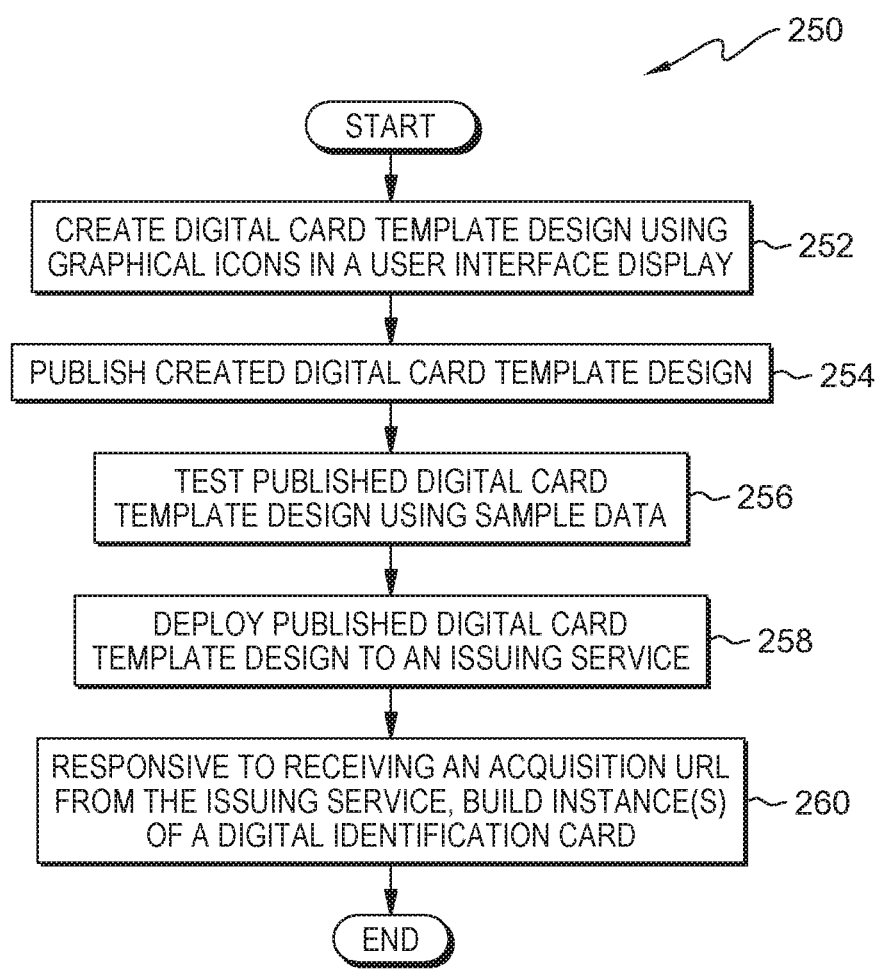
FIG. 2 is a flowchart illustrating operational steps for digital identity card management, in accordance with an embodiment of the present invention.

FIG. 2 is a flowchart 250 illustrating operational steps for digital identity card management, in accordance with an embodiment of the present invention. FIG. 3 shows program 300 for performing at least some of the method operations of flowchart 250. This method and associated software will now be discussed, over the course of the following paragraphs, with extensive reference to FIG. 2 (for the method operation blocks) and FIG. 3 (for the software blocks).

In step 252, design interface module 306 creates a digital card template design using graphical icons in a user interface display. A digital card template design, as used herein, refers to a digital identity card template that can be used to create digital identity cards (e.g., driver's licenses, student IDs, membership cards, etc.). A digital card template design can also be referred to as a "brand" or "digital card design".

In this embodiment, design interface module 306 creates a digital card template design by accessing design app 104 (e.g., as shown in FIG. 1). Responsive to receiving one or more user inputs in design app 104, design interface module 306 can create a digital card template design having various identification images (e.g., photo identification), identification information (e.g., date of birth, address, height, etc.), and security elements (e.g., barcodes, signature elements, etc.), as described in greater detail with regard to FIGS. 5A-5G. In this embodiment, a user input can be a graphical icon selection. A graphical icon as used herein, denotes one or more program instructions to perform a manipulation or design element on a digital card template design. For example, graphical icons can denote program instructions for insertion of a background image, image item manipulation, font styles, text elements, signature elements, security marker elements, development, etc. as shown and described in greater detail with regard to FIGS. 5A-5G.

In step 254, publisher module 312 publishes the created digital card template design. In this embodiment, publisher module 312 publishes the created digital card template design by saving it to persistent storage 210. In other embodiments, publisher module 312 can publish the created digital card template design by saving it to one or more components of digital template management system 100 of FIG. 1.

A user, such as a design manager can then manage the published digital card template design. In this embodiment, the user (e.g., the design manager) can manage the published digital card template design using management interface module 308 to access a management app (e.g., management app 106 of FIG. 1). In this embodiment, management interface module 308 access management app 106 using a browser and web service to access, edit, save (i.e., publish), and deploy digital card template designs, as discussed in greater detail with regard to FIGS. 6A and 6B. In this embodiment, each time a digital card template design is published, the previous version of the digital card template design is moved to a repository (e.g., server 112) to enable the previous version to be accessed in the event that previous version is required.

In step 256, test interface module 310 tests the published digital card template design using sample data. In this embodiment, testing interface module 310 tests the published digital card template design by accessing a test app (e.g., test app 108 as mentioned in FIG. 1) and using sample data embedded in the published digital card template design, as described in greater detail with regard to FIG. 7. Accordingly, testing interface module 310 can provide the user with a visual display of the digital card template design having inputted sample data. The user can then make additional changes to the published digital card template design using design interface module 306 to access design app 104.

In this embodiment, testing interface module 310 shows fields (e.g., via highlighting the fields in test app 108) that are being used by the design of the digital card template and populates the fields with sample data that can be changed by a person testing the published digital card template design. For example, testing interface module 310 can show the field for "Iso18013-4d" which is the display field for a serial number associated with the customer. In other embodiments, testing interface module 310 can access sample data from one or more other components of digital template management system 100.

Testing a digital card template design is important to view any fields that might be missing. For example, in instances where the digital card template design has a security code (e.g., PDF417, code 128, QRcode, custom, etc.) with sample data, the barcode will be produced with "red text" over the barcode indicating that "no data" has been generated on the barcode. In this manner, testing interface module 310 can generate an alert to a user that data is missing for certain fields.

In this embodiment, testing interface module 310 can request an acquisition URL with POST parameters to simulate the final deployed card. An acquisition URL as used herein, refers to a URL that points to customer designed web page that is used as a Point of Sale (POS) to obtain information which is then used to select a digital template design and populate respective fields for a selected digital template design. For example, an acquisition URL can specify the type of deployed digital identification card template is desired and/or required (e.g., a digital card template for a learners permit versus a license with full driving privileges) to fulfill the POS request by the user via the web page. Information obtained from the webpage can then be used to populate the selected digital identification card template with identity information such as date of birth, ID serial number, name, etc. Essentially, the web page is the URL.

Optionally, a user can continue to edit the digital card template design after testing. In this embodiment, a user can continue utilize management interface module 308 to select the digital card template design for further editing. Responsive to receiving a request to edit the digital card template design, design interface module 306 can access design app 104 for further editing.

In step 258, digital template system manager module 304 deploys the published digital card template design to an issuing service. An issuing service as used herein, refers to a service that creates digital identification cards. In this embodiment, the issuing service is integrated into digital template management system 100. In other embodiments, the issuing service may be a third party system or any combination of services that functions to issue and/or create digital identification cards.

In this embodiment, digital template system manager module 304 deploys the published digital card template design to an issuing service by making the digital card template design available to the issuing service. For example, digital template system manager module 304 can deploy the published digital card template design to server 112. A deployed digital card template design is a digital card template design that is available to an issuing institution's issuer service.

Figure 9A:
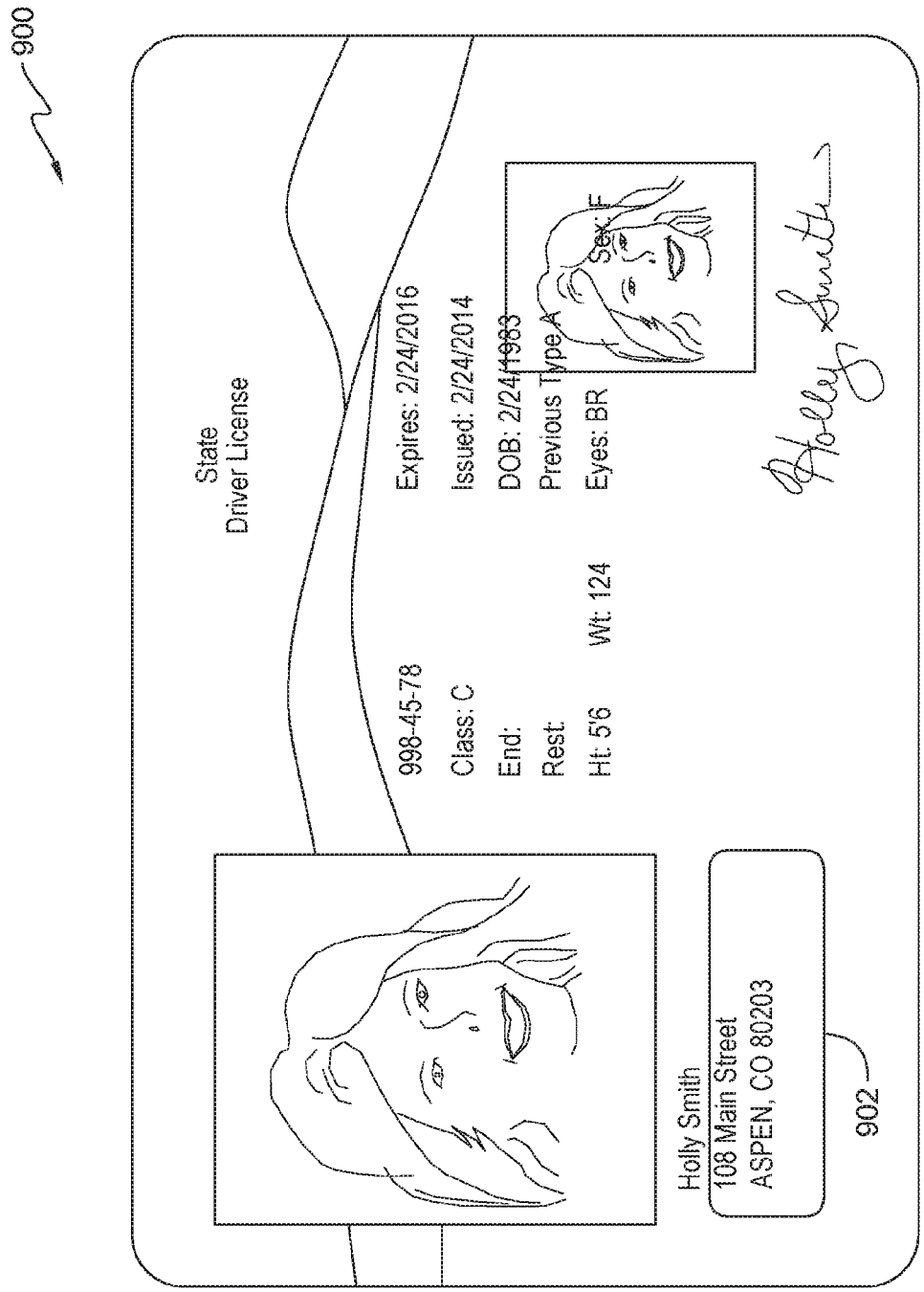

Deployed digital card template designs can be used to build individual instances of a card destined for a mobile identity customer, as discussed in greater detail with regard to FIGS. 9A and 9B. For example, three deployed digital card templates for a fishing license (e.g., design 1, design 2, and design 3, respectively) can be integrated to an issuing service of the Department of Fish and Wildlife. A customer (i.e., a person requesting a fishing license) can access the issuing service of the Department of Fish and Wildlife and choose which digital card template for a fishing license for his license (e.g., design 1), provide his information (e.g., date of birth, license number, issue date, etc.), and responsive to receiving his information, embodiments of the present invention can build an individual fishing license for the customer.

In step 260, responsive to receiving an acquisition URL from the issuing service, digital template system manager module 304 builds an instance of a digital identification card. In this embodiment, digital template system manager module 304 builds an instance of the digital identification card based on the acquisition URL. As mentioned before, an acquisition URL as used herein, refers to a URL that points to customer information that is used to select a digital template design and populate respective fields in the selected digital template design. For example, an acquisition URL can specify the type of deployed digital identification card template is desired and identification information such as date of birth, ID serial number, name, etc.

Figure 8A:
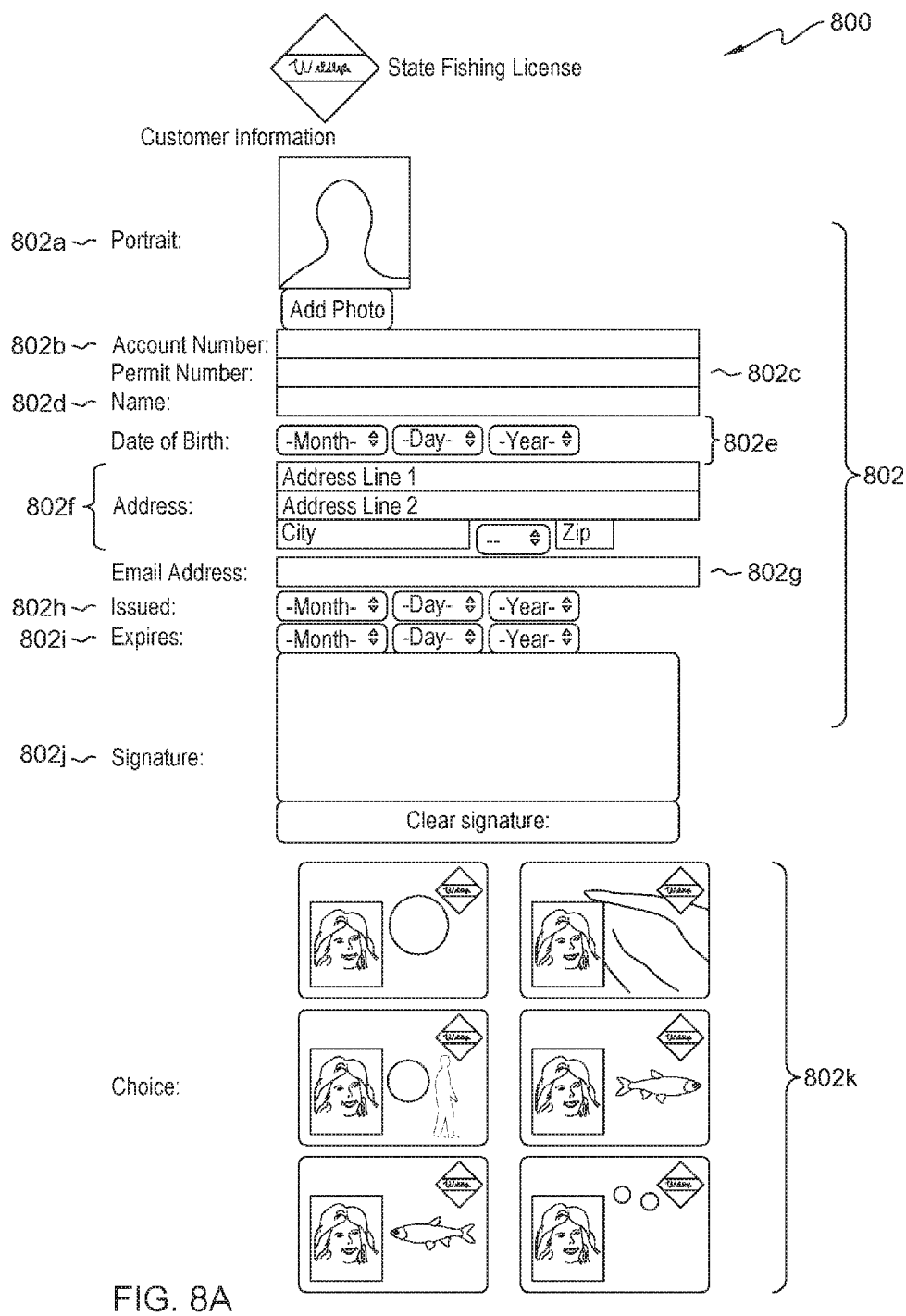
FIGS. 8A and 8B are example screenshots of a customer order form (Acquisition URL) for a digital identity card and example output using an HTML example, in accordance with an embodiment of the present invention.
Figure 8B:
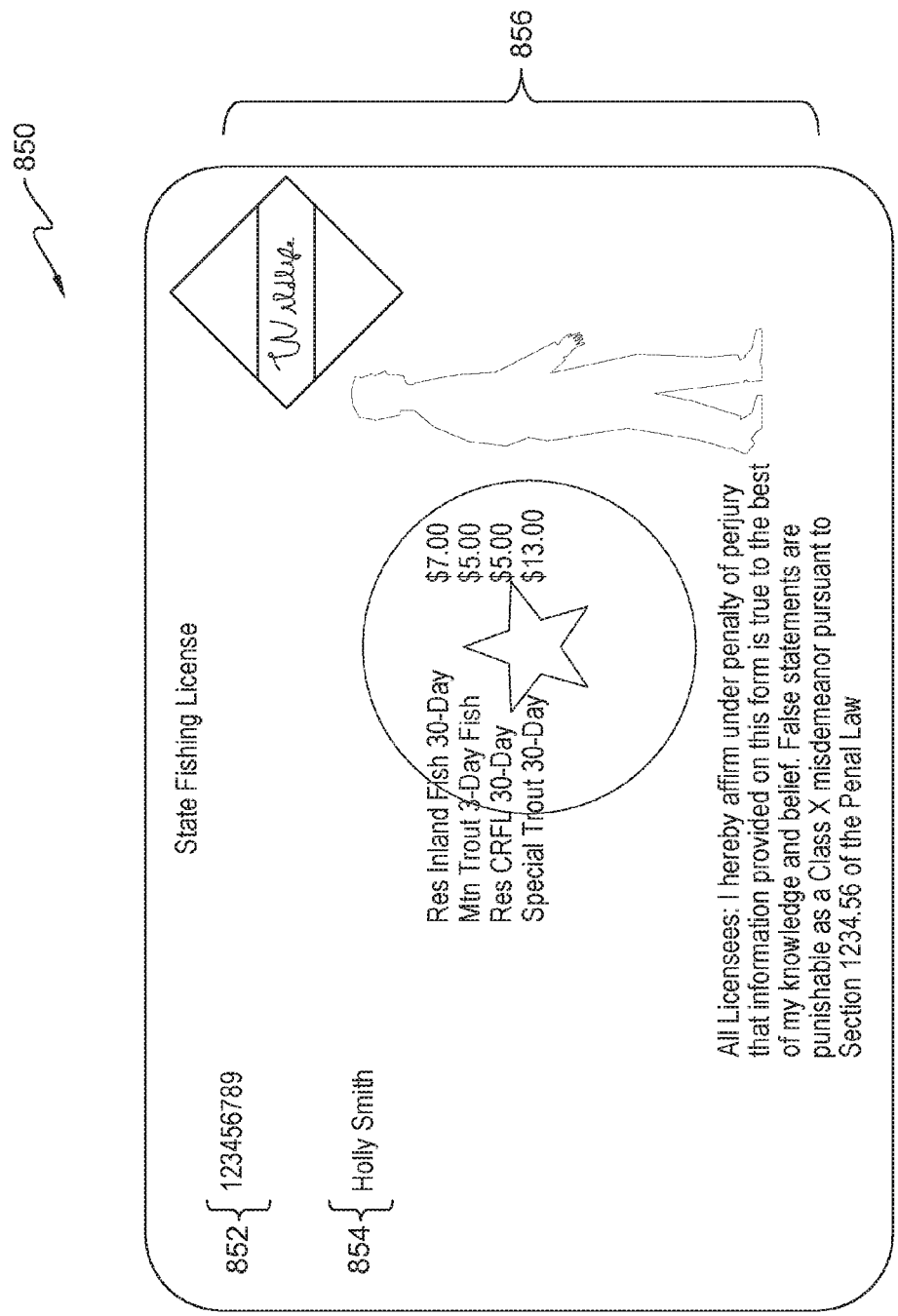

In this embodiment, digital template system manager module 304 builds an instance of the digital identification card based on the acquisition URL and the associated user information obtained by the acquisition URL (e.g., by selecting an appropriate, deployed digital template design (e.g., selecting design 1 over design 2), and binding information included in the acquisition URL to respective fields of the selected digital templated design), as discussed in greater detail with regard to FIGS. 8A and 8B. For example, in instances where a department of motor vehicles customer specifies that the customer is underage and the license to be issued is a learner's permit, digital template system manager module 304 can select the deployed digital template design that shows a special designation as "under 21" and "learner's permit restriction" (as opposed to digital template design that corresponds to a license with full driving privileges). Accordingly, digital template system manager module 304 can transmit the built digital identification card to one or more components of digital template management system 100.

III. Further Comments and/or Embodiments

Some embodiments of the present invention recognize the following facts, potential problems and/or potential areas for improvement with respect to the current state of the art: (i) current processes for integrating digital identity solutions could lead to sending invalid credentials to individuals; (ii) processes for integrating digital identity solutions are inaccessible to stakeholders involved (e.g., designers, design managers, developers, and manufacturers); (iii) current methods have no capabilities to share the form templates and work with versions of the form templates to manipulate before being deployed; (iv) there is no mechanism to incorporate data (e.g., identifying information) into form templates; (v) methods such as PDF form serve as a structure that must be filled in, saved, and mailed as an object and cannot be used as a service point that can enable a database of secure customer information as an access point by customers (e.g., institutes using the digital template management system); (vi) current methods do not have solutions for tracking versions which can be reviewed as design samples to aid in the decision to deploy the final product design; (vii) current methods using PDF forms cannot provide sample data when presenting the form for testing; (viii) current methods have no selection of binding attributes to fields for AAMVA standards to prime data; and (ix) current solutions produce elements that a programmer at an issuing website has to program and populate the design elements with data, requiring the programmer to know placement of data fields which can be inefficient as many stake holders in the decision making process need to review the digital card template and individual instance of a built digital identity card.

Some embodiments of the present invention may include one, or more, of the following features, characteristics and/or advantages: (i) streamline integration of identity solutions, governance, and security challenges using multi-faceted cards (e.g., cards used for payment, identity, participation, and facility entrance activities); (ii) offer card services the ability to meet the changing demands by providing flexible and agile design, branding, and digitizing services while co-existing with 3rd party integration requirements (i.e., offer efficient card services that allows a user to create and select the created templates with no system purchase code); (iii) allow more than one stake holder type such as a Designer, Tester, and Deployment manager to see sample results and deploy identity documents readily; (iv) improve security to reduce the chance of sending invalid credentials to individuals by allowing a manager to see what is deployed and what is published (e.g., In a design layout, the specifications and placement of objects can be displayed without needing a programmer to hard code placement and show results. In other words, a "tester" can access what has been made available without using a live system or a mirror development system for test); (v) provide ability to share identity traits from one or more digital identity documents (e.g., medical and library card) to satisfy proof of identification requests (e.g., The design app enables the defining of traits such as the ISO18013-07 Photo of a Driver's license as attribute ID iso07 and ISO18013-4d license number of the customer as attribute iso04d in creating templates such that the trait IDs are separate from the actual data used to create the final visual card. In this way, the elements are separated as individual traits to provide a means in digital identity document to share straits with concern to privacy control; (vi) allow for flexibility to share and store identities across unlimited secure devices; (vii) device to device communication support eliminates the need for broadband connectivity and central verification service, that is, verification traits, such as "21 and over" can be requested without other information being sent or requested (e.g., No custom code has to be written to access known locations of artifacts used to create a digital identity card such as a unique background. All that is needed is to select the name of a template and reproduce information acquired by the acquisition URL); (viii) increase security authentication, that is, a person's identity is determined before access is granted if anonymous people are not allowed; (ix) provide for increased availability, that is apps and services are ready when needed; (x) push-notification technology can be used to communicate the availability of new identity documents; (xi) ensure confidentiality through a secure web based account management portal; (xii) improves information tracking capabilities, that is, a person cannot perform an action and then later deny performing the action; (xiii) provide verification capabilities to prove when an issuer has sent identity documents and when devices have requested identity documents; (xiv) provide easy revocation of credentials, that is, issuers can easily and reliably purge an identity from all registered devices of an owner associated with those credentials; (xvi) all recipients of a protocol request or response can ascertain its origin (e.g., since traits are separate and labeled, embodiments of the invention can provide digital signatures for each trait that is requested and the response can ascertain if the trait "authenticate"); and (xvii) provide end to end orientated solution for design and issuance of digital card templates.

Figure 4:
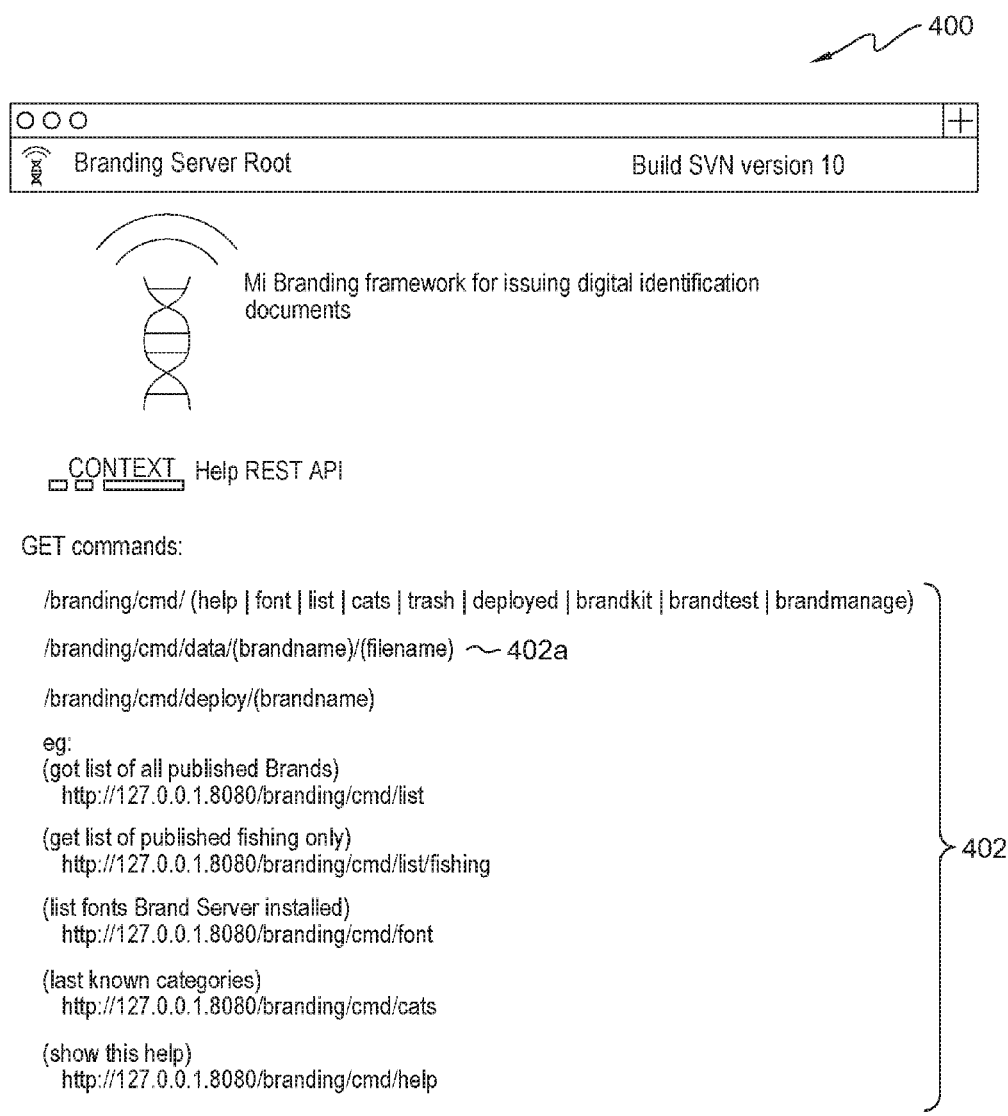
FIG. 4 is a screenshot view that shows a root page and commands, in accordance with an embodiment of the present invention.

FIG. 4 is a screenshot view 400 that shows a root page and commands, in accordance with an embodiment of the present invention. In this example, the following URL, URL 1, serves as the root page of the digital template management system (e.g., digital template management sub system 102, shown in FIG. 1):

URL 1: http://host:port/branding

The root page (e.g., screenshot view 400) enables a user to navigate through command set 402. In this example, command set 402 comprises "get" commands. For example, a user can use command 402*a* to retrieve a brand (i.e., a designed card) and a file associated with that brand. In general, the digital template management system supports a series of REST API commands and houses the digital template management system's (e.g., digital template management system 100) web applications. The set of REST API commands can be used to determine the state of the digital template management system. In this example, the commands are prefixed with "branding" which allows the digital template management system to be co-located as a service into an existing server or into a component server for branding.

Using the commands in various design management applications, branding, that is, digital card template management can be achieved. For example, a user can use the root page to execute a command (e.g., command 402*a*) to design, test, or manage a digital card template design. For example, a user can use the root page to select an application (e.g., design app 104, management app 106, and test app 108) to begin design, test a current design, or manage the current design.

FIGS. 5A-5E are example screenshot views of a design application interface, in accordance with an embodiment of the present invention. The following example discussed throughout FIGS. 5A-5E is discussed with respect to creating a new design for a student ID for a person named Holly Smith. In this embodiment, a "design" or "digital card template design" is referred to interchangeably with the word "brand".

Figure 5A:
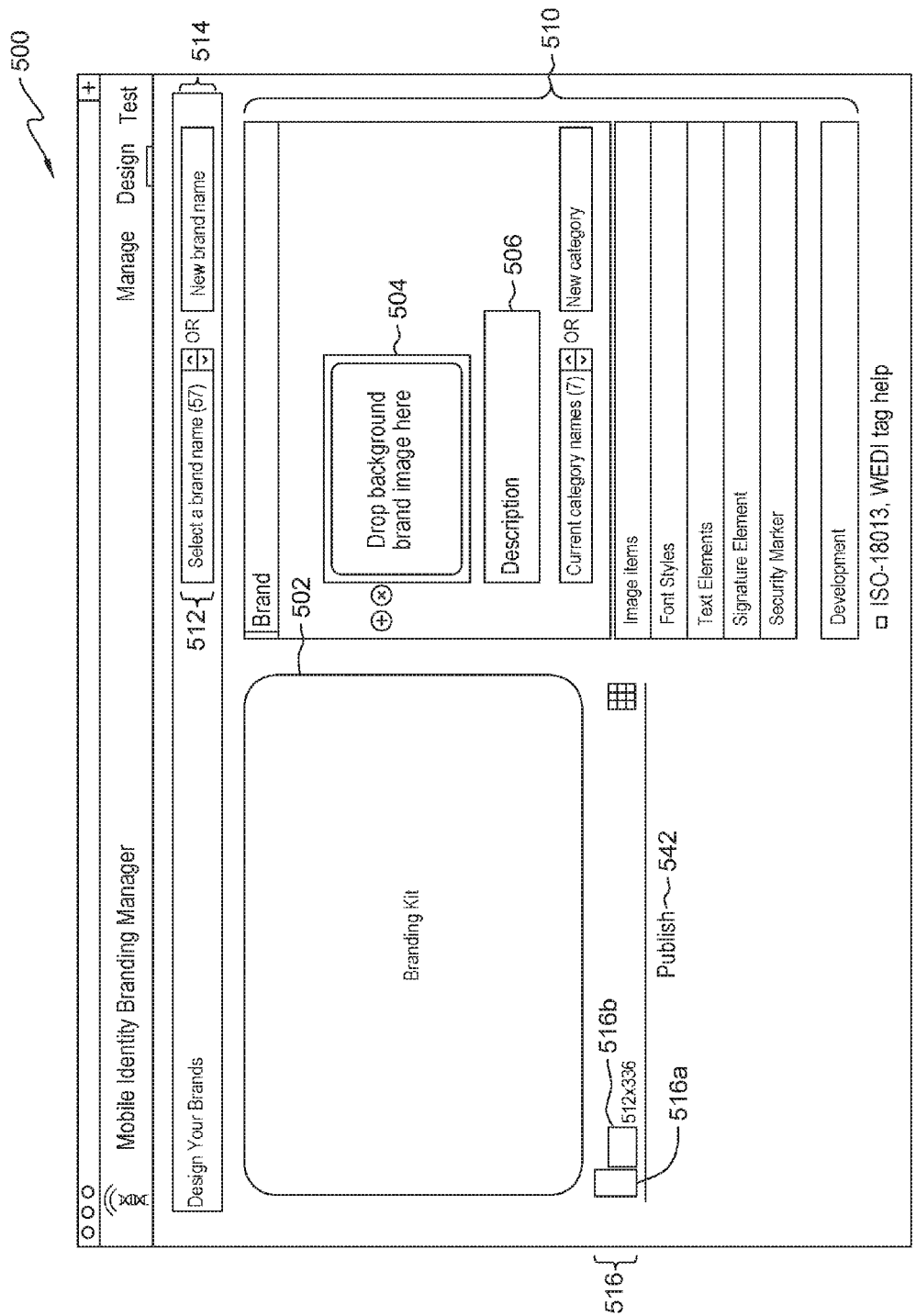
FIGS. 5A-5G are example screenshot views of a design application interface in accordance with an embodiment of the present invention.

In FIG. 5A, screenshot 500 depicts a design application interface, in accordance with an embodiment of the present invention. The design application interface is loaded and otherwise managed by a design interface module accessing a design application (e.g., design interface module 306 of program 300 accessing design app 104, discussed earlier).

A user, such as a designer, can load a published design or create a new design. For example, where a previous design has been created and saved, a user can load a published design by interacting with menu 512. In this embodiment, menu 512 is a selectable drop down menu. In other embodiments, menu 512 can be a search field. In instances where a new design needs to be created, the user can create a new design by typing in box field 514.

Visual attributes, such as image items, font styles, text elements, signature elements, security markers, etc. can be controlled by respective selectable fields of control area 510. For example, responsive to a user selecting the "font styles" option of control area 510, a new display is generated comprising selectable font styles for the new design.

Display area 502 is an area that displays inputs selected by the user. For example, a user can add an image into image field 504, add a description of the image in description field 506 or select category names (e.g., from menu 512) or create new category names from box field 514. Responsive to receiving the user's selections (e.g., the image added into image field 504 and a description of the image in description field 506), the design interface module can update display area 502 to reflect the user's selections as shown in FIG. 5B.

In this example, layout of the design can be updated to reflect a horizontal or vertical layout. In this embodiment, the default selection is a horizontal layout as shown by area 516. Area 516 comprises selectable fields 516*a* and 516*b*. Selectable field 516*a* denotes the option for a vertical, that is, portrait layout (e.g., 336×512). Selectable field 516*b* denotes the option for the horizontal, that is, landscape layout (e.g., 512×336).

Once a design is completed, the user can select button 542 to "publish" a design. In this embodiment, "publishing a design" refers to saving and naming the design for the future use and testing, as discussed in greater detail later in this specification.

Figure 5B:
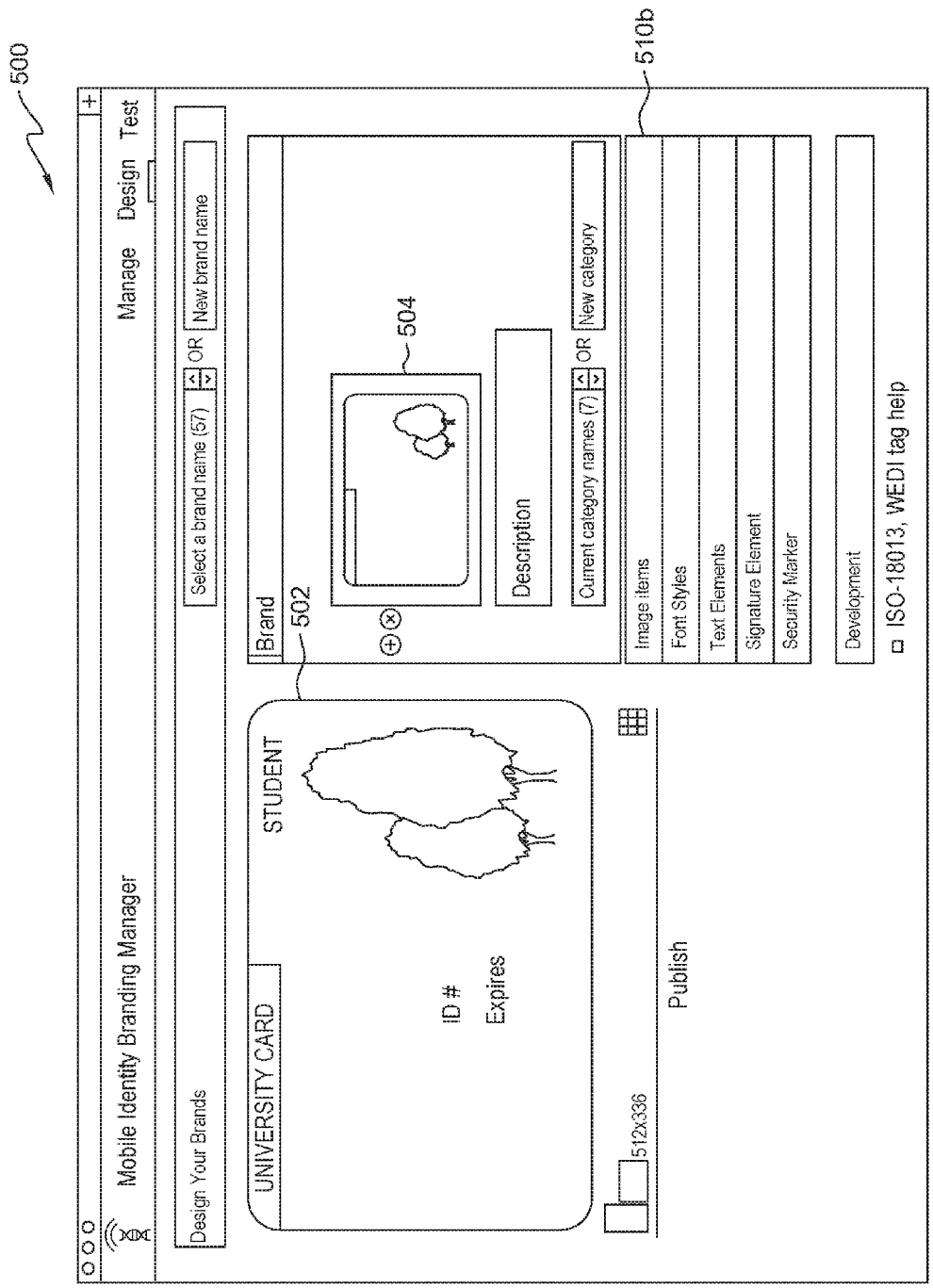

FIG. 5B depicts screenshot 500 having an updated display area that includes a selected background image, in accordance with an embodiment of the present invention.

In this example, a user has added an image to image field 504. Responsive to receiving the user selection (e.g., the addition of the image to image field 504), the design interface module can update display area 502 to reflect the image selected in image field 504.

In this example, the user has also selected option 510*b* of control area 510. Option 510*b* denotes an image item field that allows a user to add an image item such as a photo identification of a person different from the user.

Figure 5C:
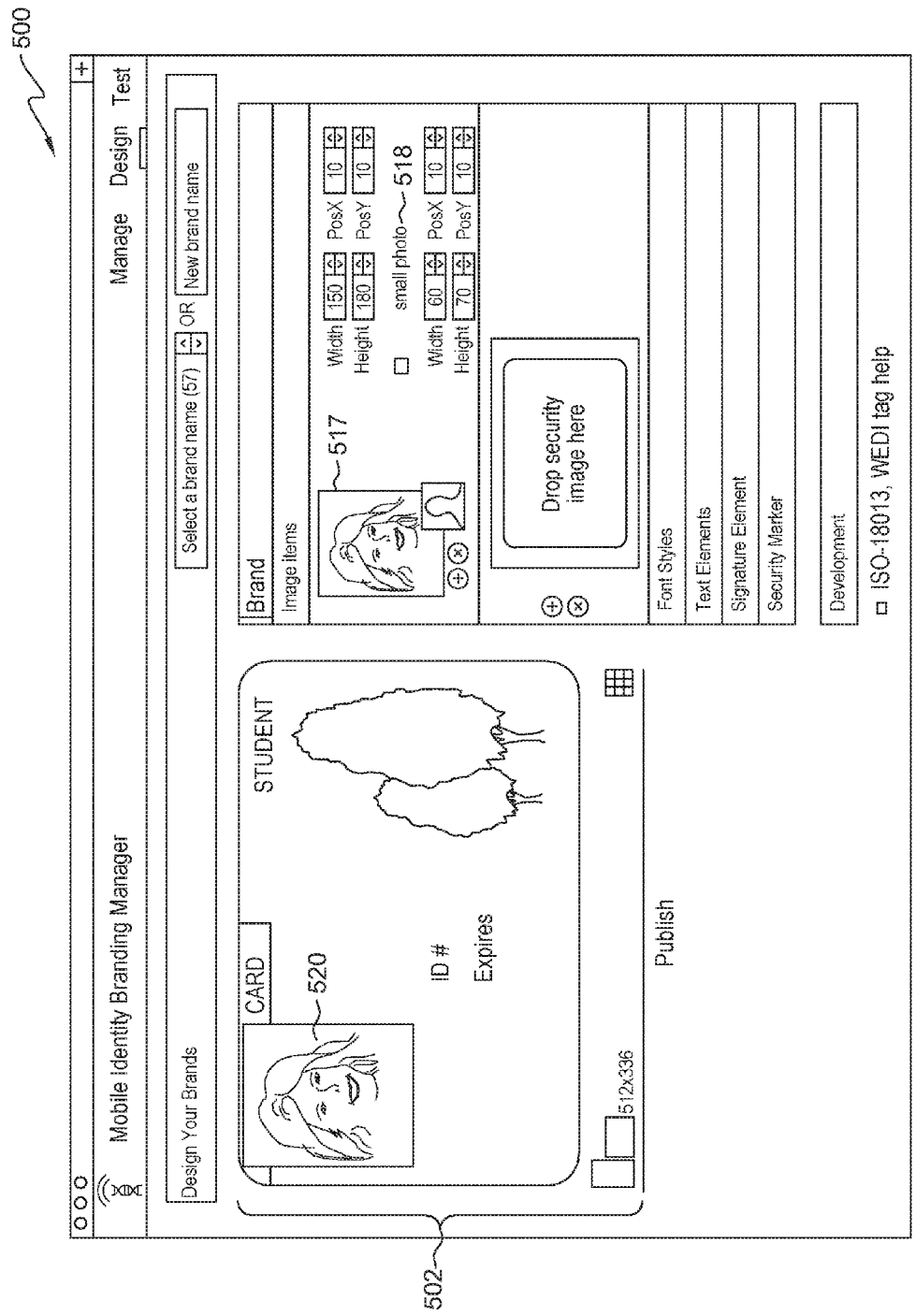

FIG. 5C depicts screenshot 500 having an updated display area that includes an image items used to identify a person, in accordance with an embodiment of the present invention. Continuing the above example, screenshot 500 has been updated to reflect the "image item" display that was generated, responsive to a user selecting option 510*b* of control area 510 in FIG. 5B. In this example, the user has selected an image for the student by selecting option 517. The changes to display area 502 can be seen by the addition of element 520 (e.g., the user selected image).

Figure 5D:
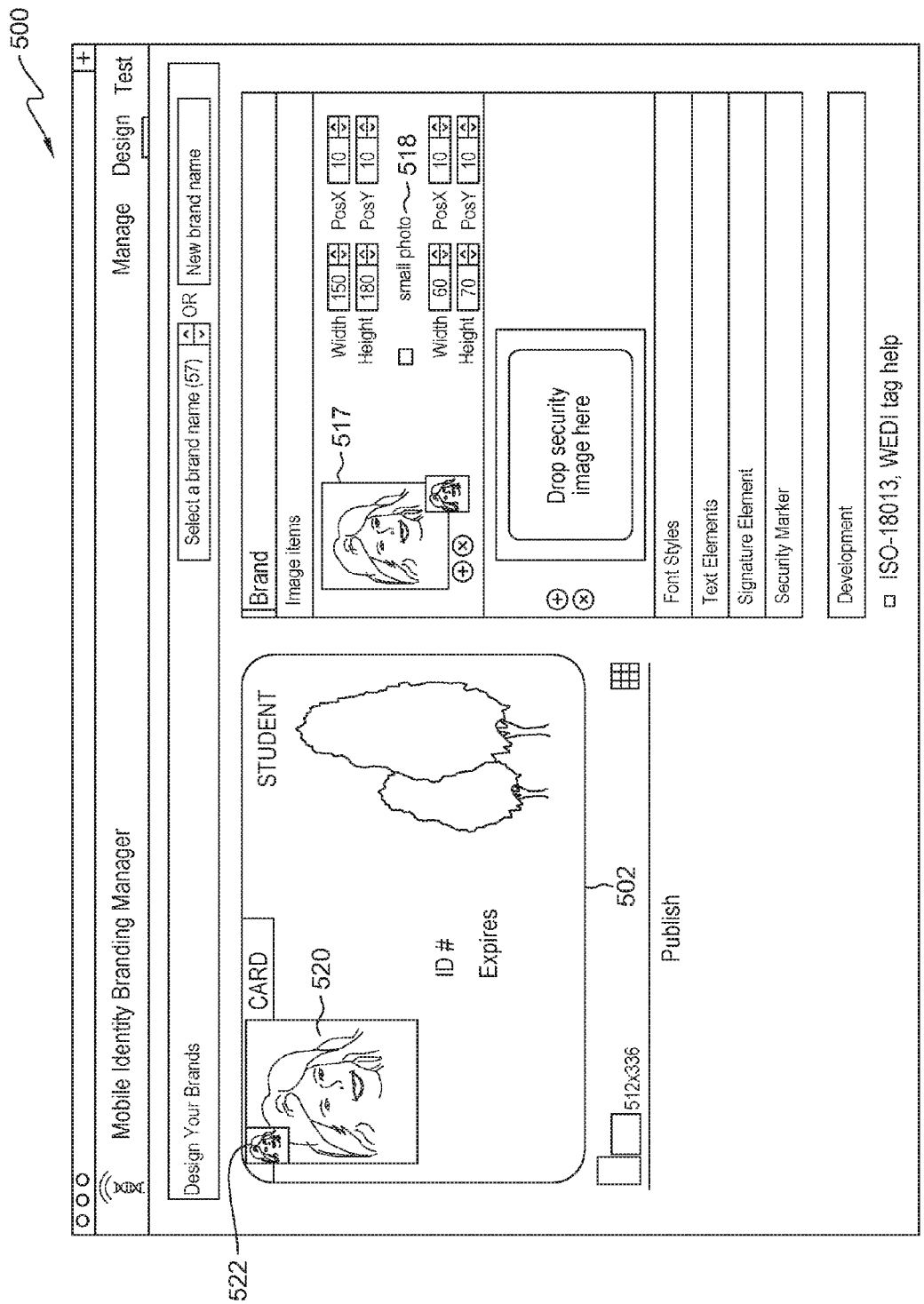

FIG. 5D depicts screenshot 500 having an updated display area to reflect positions of image items within the display area, in accordance with an embodiment of the present invention. In this example, the user has further selected option 518 which denotes the option to add a small photo of the selected image, as shown by element 522.

In this embodiment, the position of selected images can be manipulated by dragging each selected image across display area 502. For example, elements 520 and 522 can manipulated to be displayed on a different area of display area 502. In other embodiments, the position of the selected image can be manipulated using correspond set of spin button controls for each image (not shown).

Figure 5E:
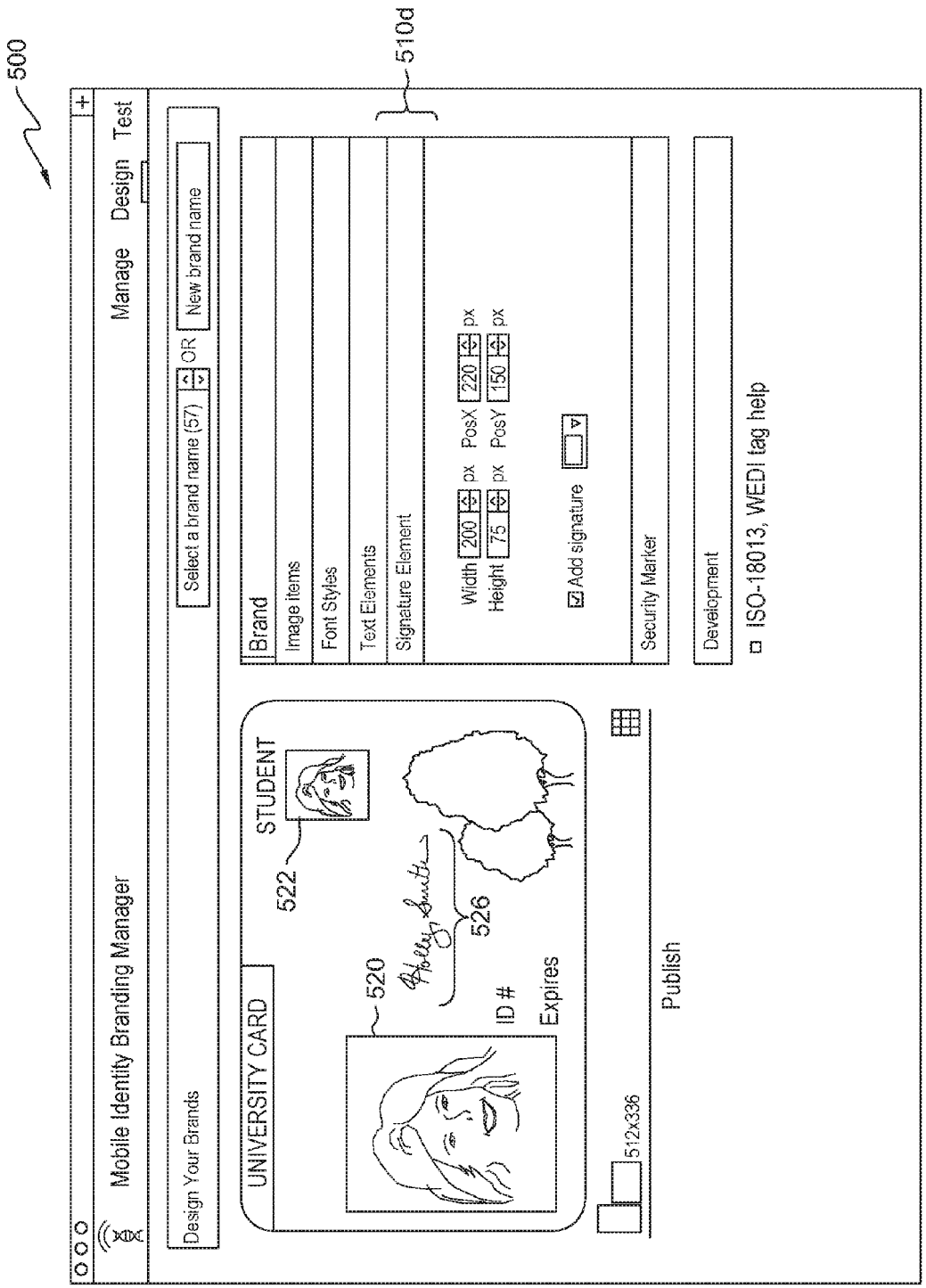

FIG. 5E depicts screenshot 500 having an updated display area to reflect the addition of a signature element, in accordance with an embodiment of the present invention. In this example, the user has chosen to add a signature element. In this example, responsive to selecting option 510*d* (e.g., the signature element), the design interface module can generate a display for adding a signature. Accordingly, the signature element, as denoted by element 526. Other elements that are displayed in FIG. 5E include elements 520 and 522 which correspond to a varying sizes of photographic identification (e.g., an image).

Similar to the photos above, the signature element can be dragged into position or sized using an input device (e.g., a mouse), or can be sized and positioned using spin control buttons (not shown). The signature element display also includes a color selection control to specify the desired color of the signature. In this example, the color of the signature element has been changed to contrast with the background image in the position in which the signature element was placed to ensure that the signature can be easily read.

Figure 5F:
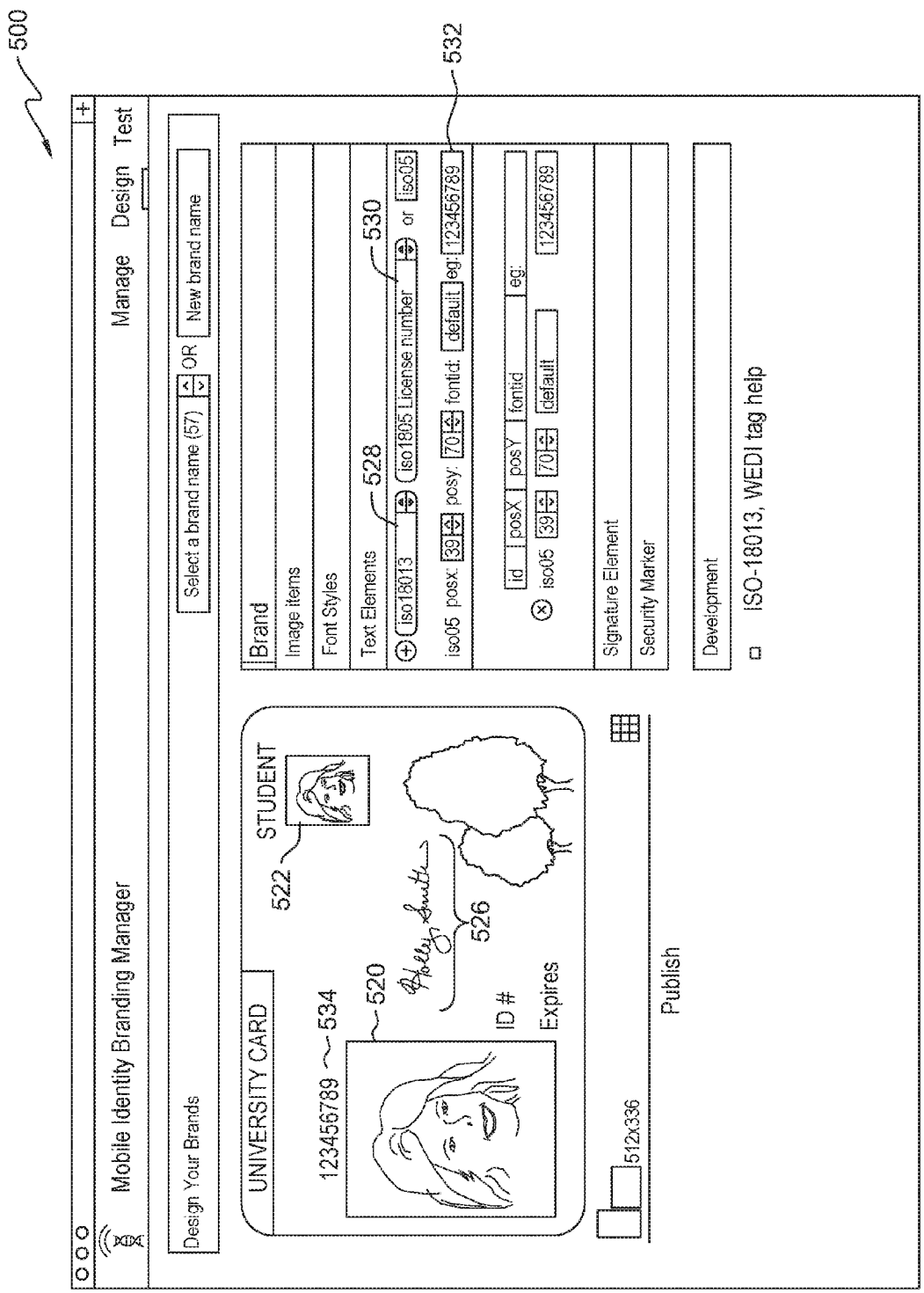

FIG. 5F depicts screenshot 500 having an updated display area to reflect text element selections, in accordance with an embodiment of the present invention. In this example, the text element selections correspond to a give identification value that corresponds to a known category or trait identification.

In this embodiment, list 528 includes a standard list of options. Select tag list 530 indicates appropriate student ID number text. For example, iso04d or iso05 would be appropriate for the student ID number text element being designed. Iso04d (e.g., an administrative number) and iso05 (e.g., a license number) could be chosen as the text element ID by either selecting "iso18013" from a "standard list" and then selecting "iso04d" or "iso05" from the select tag list or by directly editing the text ID field to hold the value "iso04d" or "iso05".

Box 532 denotes a location in which sample text can be added to provide a license number or any other identification numbers. In this example, box 532 indicates that the identification number is 123456789. Accordingly, responsive to inputting the identification number, the design interface module can update the display area to show the identification number, as shown by element 534.

Figure 5G:
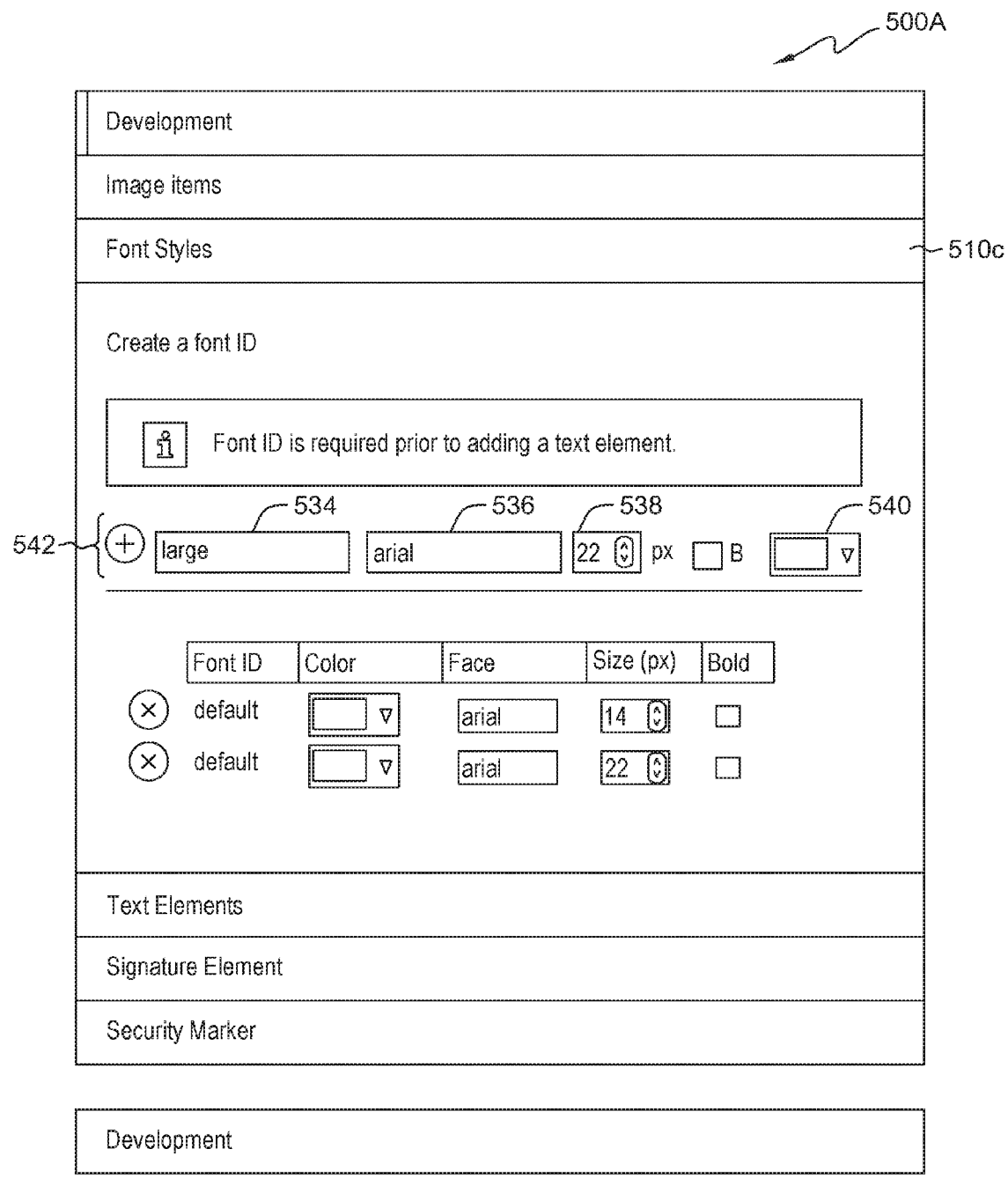

FIG. 5G depicts a portion of screenshot 500, designated as 500A pertaining to font styles, in accordance with an embodiment of the present invention. In this example, the user has selected option 510c which denotes "font styles". In instances where the user determines that the default font does not seem large enough, the design interface module can enable the user to create new "font styles".

In this example, the user has chosen to create a new font style, named "large" into element 534. The user can select or type in the type of font into box 536. In this example the user has specified the font "arial." The user has further specified in box 538, the font size (e.g., 22) and that the font color is black (e.g., via box 540). To save this new font, the user can select button 542. Accordingly, responsive to a user selection of the "large font", the design interface module can update display area 502 to show the identification number with the larger font size.

When a design is completed, the user can choose to save the design for future use. In this embodiment, a design is saved by publishing (e.g., via pressing a "publish button" as shown on described in FIG. 5A) and naming the design. As described in greater detail with regard to FIGS. 6A and 6B, embodiments of the present invention.

Figure 6A:
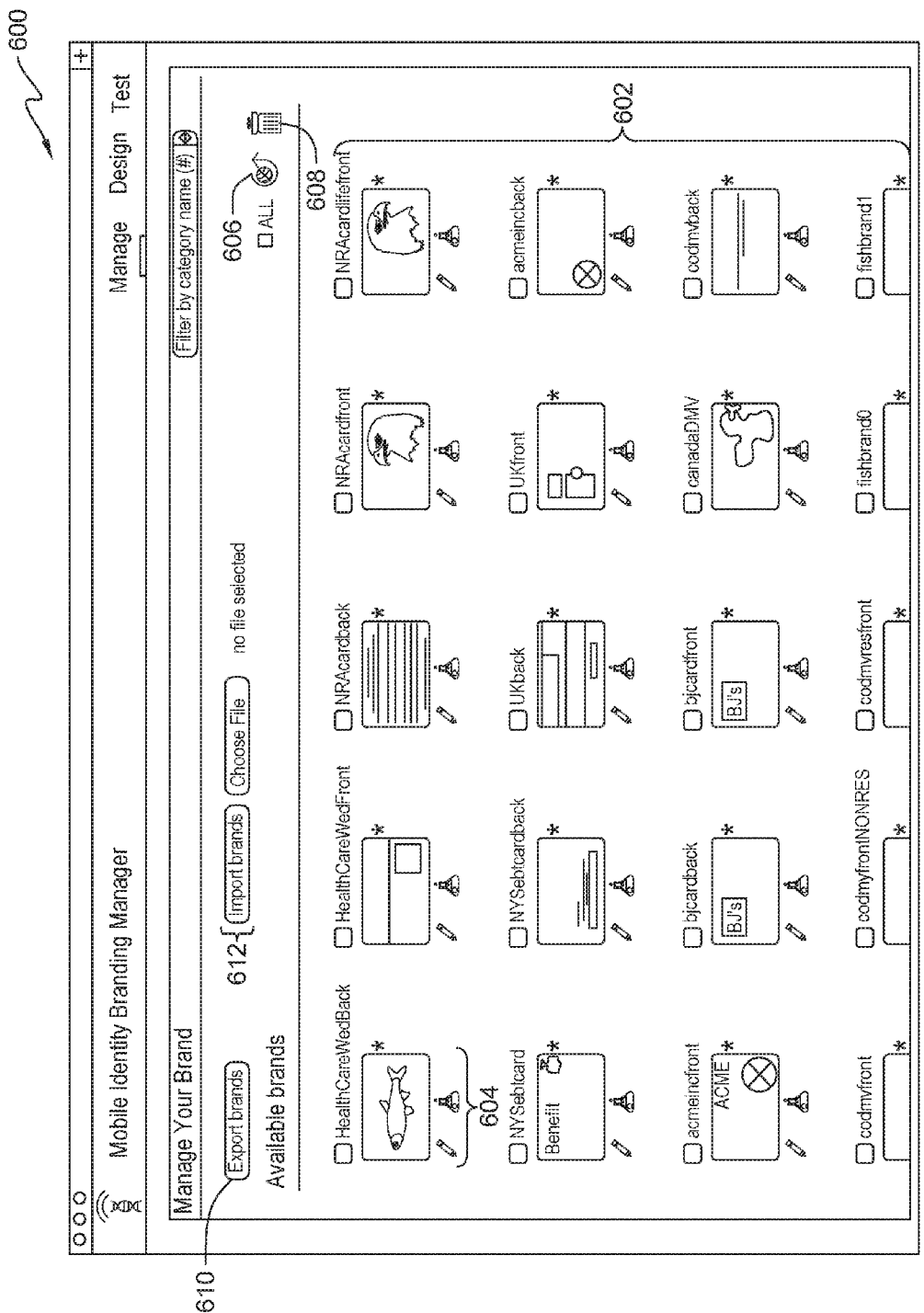
FIGS. 6A and 6B are an example screenshots of a management interface, in accordance with an embodiment of the present invention.
Figure 6B:
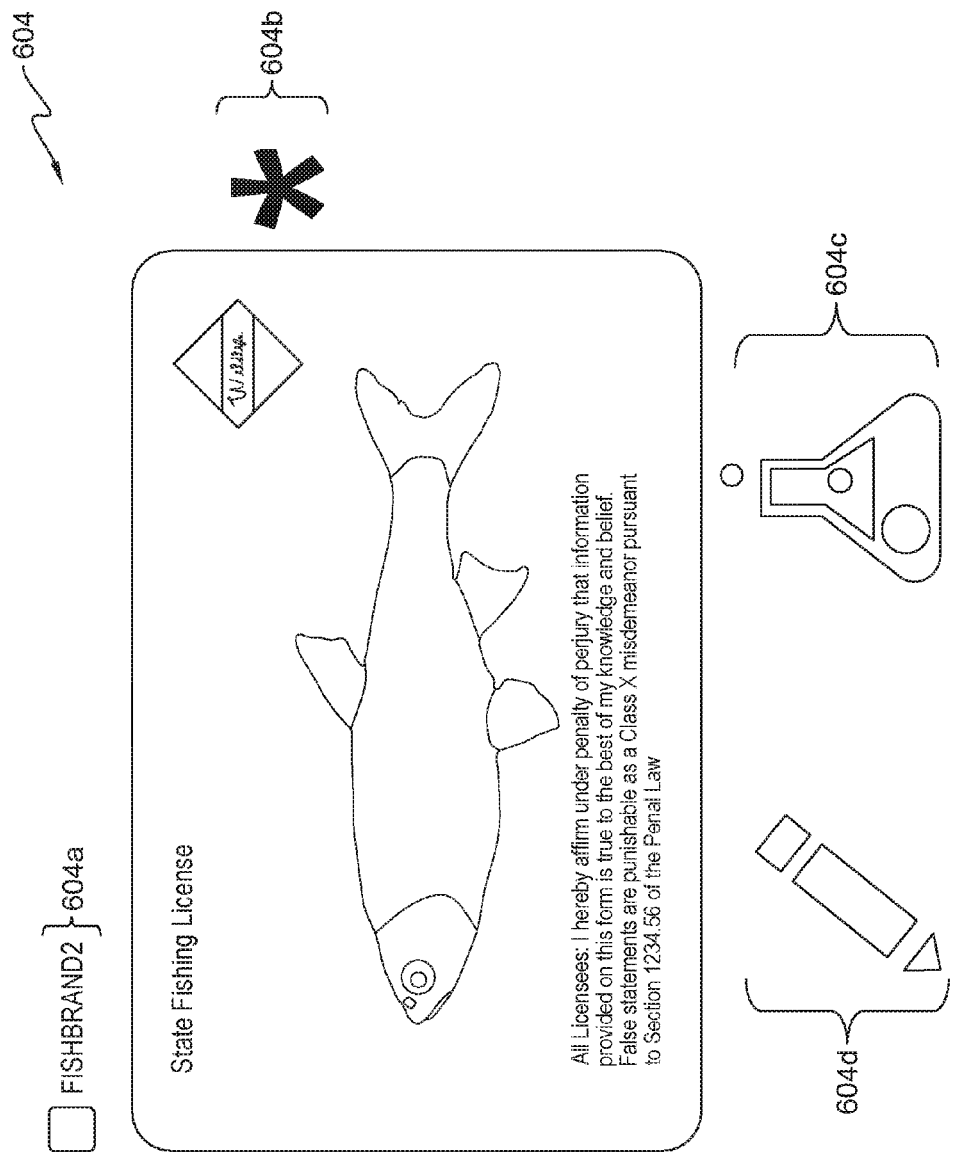

FIGS. 6A and 6B are an example screenshots of management interface, in accordance with an embodiment of the present invention.

FIG. 6A shows screenshot 600, a screenshot view of a management interface that displays saved designs. Specifically, display field 602 shows multiple saved designs. The management interface module (e.g., management interface module 308) can be used to access management interface app (e.g., management app 106) to manage saved designs. In this embodiment, a "saved design" can be used interchangeably with a "published brand" and a "deployed brand". A published brand can be tested while a deployed brand is a published brand (i.e., design) that is available to an issuing institution's Issuer Service (i.e., the service that issues the digital card to a consumer) and can be used to build (i.e., design) individual instances of a digital card for a mobile identity customer.

In this example, screenshot 600 also show graphical icons outside of display field 602 that allow a user to further manage the saved brands. For example, button 606 allows a user to deploy a brand. Button 608 allows a user to delete a saved brand.

The management app (e.g., management app 106) further includes the capability to import and export brands. For example, button 610 allows a user to export brands. When selected, button 610 creates a zip file which includes all brands that have been created. The created zip file can be backed up to protect against data loss. Button 612 allows a user to import brands. For example, when selected, button 612 allows the user to import the zip file back into the management app after it has been restored to a known state.

To access the management app, (e.g., management app 106), a customer can type in the following URL:
URL 2: http://host:port/branding/cmd/brandmanage In this example, published brand 604 is an example published brand display that includes one or more graphical icons that can further manipulate or otherwise edit the published brand, as discussed in greater detail with regard to FIG. 6B. A graphical icon (e.g., graphical icon 604b, as shown in described in FIG. 6B) denotes that published brand 604 has been "deployed". A published brand that has been deployed that allows an Issuer service (i.e., the server that processes or interprets requests for digital mobile documents) to use the design (i.e., brand) for producing digital products. If a brand is not deployed the Issuer Service cannot use it. Deployment marks the final step toward making a document type live and available for acquisition.

In this embodiment, the Issuer Service receives a request for a document targeted for a specific user. Based on the type of document requested, the Issuer Service can select the appropriate deployed brand to serve as the template to hold the customer's data (obtained via an acquisition URL) and pass this information through a document generator. The document generator can then build a custom document using information obtained from the acquisition URL and transmit that document for distribution to the end user.

FIG. 6B shows an enlarged view of published brand 604, in accordance with an embodiment of the present invention. Published brand 604 includes a collection of graphical icons (e.g., graphical icons 604a-604d) that correspond to commands that, when selected, identifies the saved brand and provides the option to manipulate or otherwise edit the saved brand. For example, when selected, graphical icon 604a allows a user to select the saved brand. Graphical icon 604b indicates the status of the saved brand. In this example, the asterisk denotes that the brand has been deployed and is available for to be used by an issuer service.

Graphical icon 604c allows the user to test the saved brand, where sample customer data can be injected into the card to verify the design and layout of the card.

Finally, graphical icon 604d allows the user to edit the saved brand, that is, when selected, graphical icon 604d can open the design app (e.g., design app 104) to edit and make further changes which will result in a version created for the previous non-edited brand. For example, a brand name can be "Fishing1." Responsive to editing "Fishing1", a new version of "Fishing1" can be saved in the management app (e.g., management app 106) and the previous version of "Fishing1" can be timestamped to denote and identify the previous version of "Fishing1."

Figure 7:
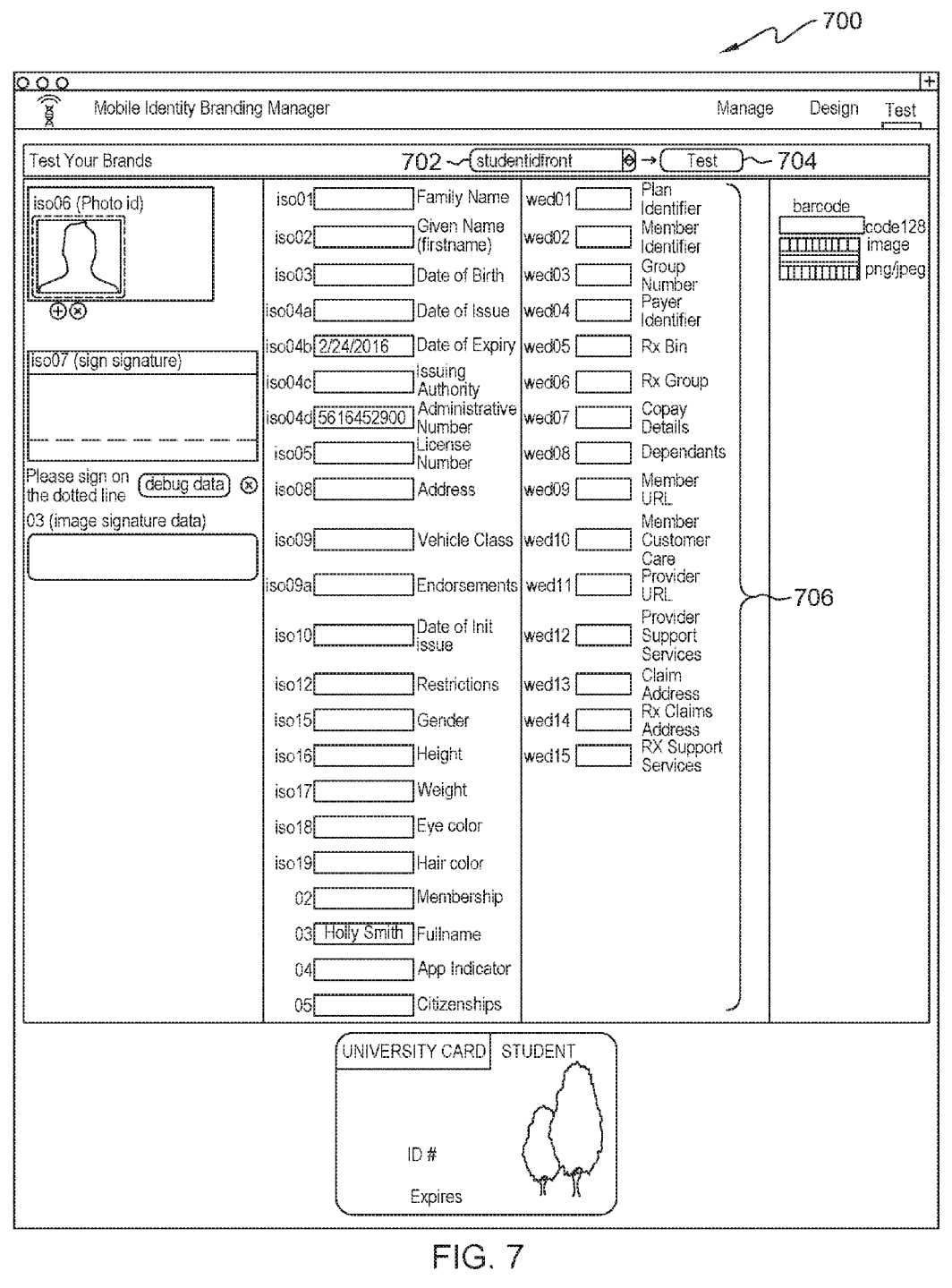

FIG. 7 is an example screenshot 700 of a testing interface, in accordance with an embodiment of the present invention. In this example, a design has already been created and published. The digital template management system (e.g., digital template management sub system 102) includes a testing app (e.g., test app 108) which serves as a test facility for published brands. A user testing the publish brands (i.e., a tester) can choose a published brand and can provide sample data to apply to the brand (i.e., the published design). The test app provides the tester with the capability of entering data for any type of category that is associated with the digital card template (i.e., the published design).

To access the test app, a user can enter the following URL:
URL 3: http://host:port/branding/cmd/brandtest To begin testing, a user can select a published brand from menu 702. In this example, the user has selected the "studentidfront" published brand. Responsive to receiving the selection, the testing app can load the selected brand. In this example, the test app shows options 706 in the display area. Fields used by the digital design card are outlined in gray. Options 706 are a collection of respective test fields that can be populated to test the selected brand. For example, a respective test field can be a member ID number, date of birth, issue date, expiration date, etc.

In this embodiment, when the selected brand loads, any existing test field values being used with a previously selected brand will be cleared. Sample data specified by a designer (i.e., a person using design app 104) when creating the brand will be pre-loaded into their respective test field. Test button 704 allows a user to "test" the user selections and view the selections on the published brand. In other words, by selecting test button 704, the test app (e.g., test app 108) can generate an image of the selections on the published brand. Stated another way, by selecting test button 704, a user can view a "preview" version of what the final digital identity card would look like before deployment of the digital identity card to an end user.

FIGS. 8A and 8B are example screenshots of a customer order form (Acquisition URL) for a digital identity card and example output using an HTML example, in accordance with an embodiment of the present invention.

FIG. 8A shows an example customer HTML form 800, in accordance with an embodiment of the present invention. In this example, the digital template management system (e.g., digital template management sub system 102) generates a digital identity card responsive to receiving information acquired from an acquisition URL. Specifically, in this example, a customer fills out an order form for a fishing license. In this example, the customer has 6 digital card template designs at display field 802k to choose from (e.g., fishbrand1, fishbrand2, fishbrand3, fishbrand4, fishbrand5, and fishbrand6). The data fields, once filled in, will be used by the acquisition URL to populate and request the correct card with the appropriate credentials.

In this example, display field 802 denotes fields in which users can input identification information. For example, data field 802a denotes the input field for "portrait" (e.g., a photograph for identification purposes). Data field 802b denotes the input field for a customer's account number. Data field 802c denotes an input field for the customer's permit number. In this example, the license ID is 123456789. Data field 802d denotes the customer's name. In this example, the user's name is "Holly Smith."

Data field 802e denotes the customer's date of birth. Data field 802f denotes the input field for the customer's address. Data field 802g denotes the input field for the customer's email address. Data field 802h denotes the input field for the issue date of the license. Data field 802i denotes the input field for the expiration date of the license. Data field 802j denotes the input field for the customer's signature. Display field 802k denotes the six digital card template designs a customer can choose from. In this example, the user has selected "fishbrand3". Data field 802d denotes the input field for the customer's name.

FIG. 8B shows an example output 850 generated by the digital template management system (e.g., digital template management sub system 102, in accordance with an embodiment of the present invention.

Specifically, example output 850 is a digital identity card that reflects the selections of FIG. 8A. As shown, display field 852 denotes the placement of the ID number: 123456789. Display field 854 denotes the cardholder's name, Holly Smith. Background image 856 indicates the design (i.e., brand) chosen, "fishbrand1."

In some embodiments, the digital template management system enables a user to add a new font to a browser and to the server (e.g., server 112). In instances where a font has not been installed in the browser, the digital template management system would show the default font when designing a digital card template design (i.e., a brand). The server may have the font and produce the expended results in the testing app which can access server 112 for the display results. Embodiments of the present invention do not require users to install a font into a browser.

FIGS. 9A and 9B are example screenshots screenshot of editing text elements such as a multi-line field, in accordance with an embodiment of the present invention. Embodiments of the present invention provide a feature for editing and display paragraph (i.e., multi-line) data for a field.

FIG. 9A is an example screenshot 900 depicting a paragraph data for a given field. In this example, screenshot 900 shows a sample driver's license. Area 902 denotes paragraph data for an address, which is generally displayed on two separate lines.

FIG. 9B is an example screenshot 950 of text element controls, in accordance with an embodiment of the present invention. As shown, editable field 904 displays the field for inputting sample data for an address. In this example, the sample address is 108 Main Street, Aspen, Colo. 80203. In this embodiment, the following command "\n" provides instruction to create a new line. Accordingly, the sample data (e.g., 108 Main Street, Aspen, Colo. 80203) is displayed on two lines. In this way, multi-line fields of data can be displayed on digital identification cards.

Embodiments of the present invention provide solutions for defining categories for saved designs (e.g., digital cards). In this manner, the digital management system can define categories such as "Identity" to sort groups in the management app of the digital management system. Embodiments of the present invention further provide the ability to note different descriptions of respective categories to enable a user to sort through multiple template versions. For example, sample descriptions for identity cards can be "faculty", "student", and "vendor" for an identity card for a university. In another example, a user can specify as a description of the category "Identity" as "University identity Front of Card) to enable the user to sort through multiple template versions. In yet other embodiments, the digital management system can allow a manager of the Management App (e.g., management app 106) to sort digital identity cards by different categories of digital identity cards such as "fishing" or "DMV."

Figure 10A:
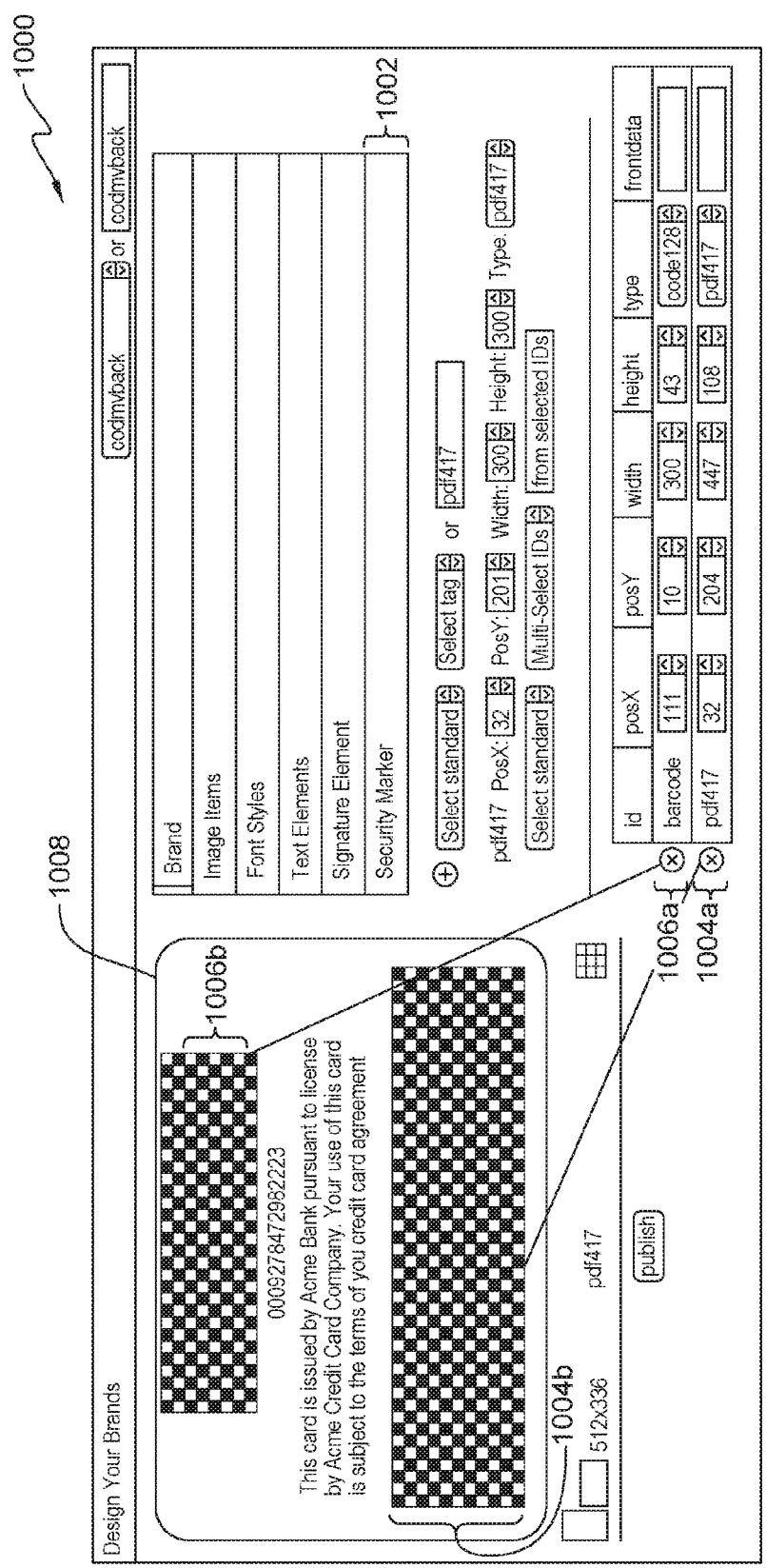
FIG. 10A-10C are example screenshots of security marker generation, manipulation, and output, in accordance with an embodiment of the present invention.
Figure 10B:
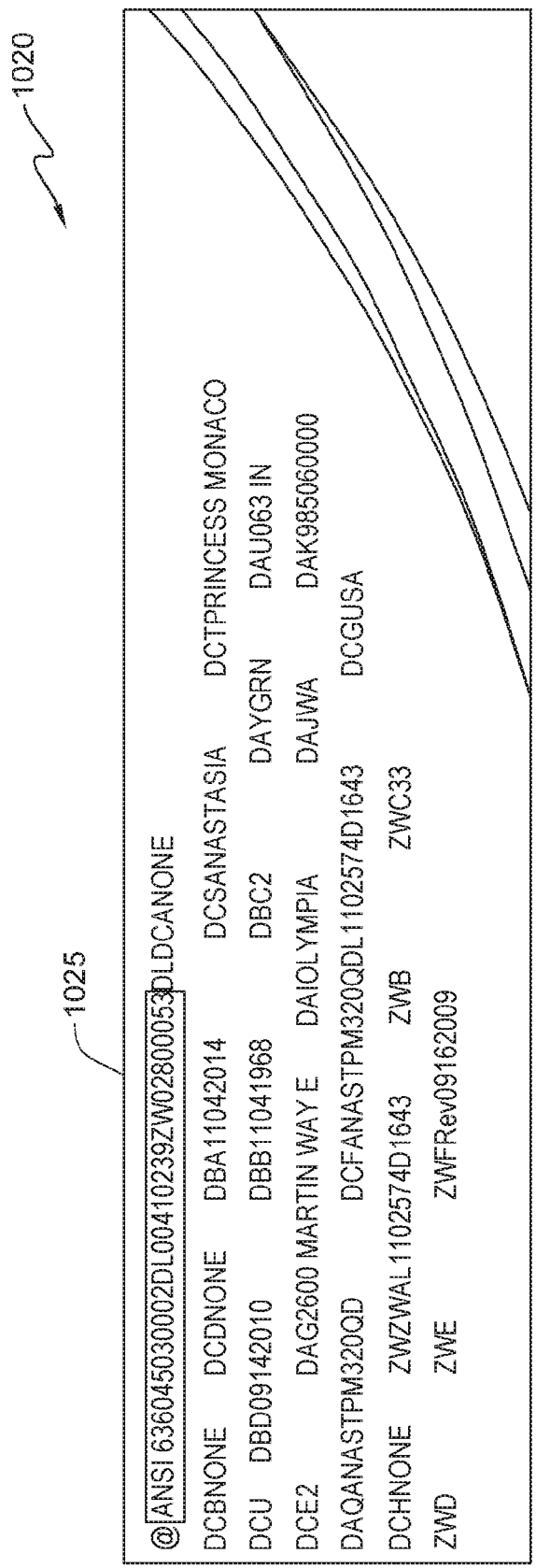
Figure 10C:
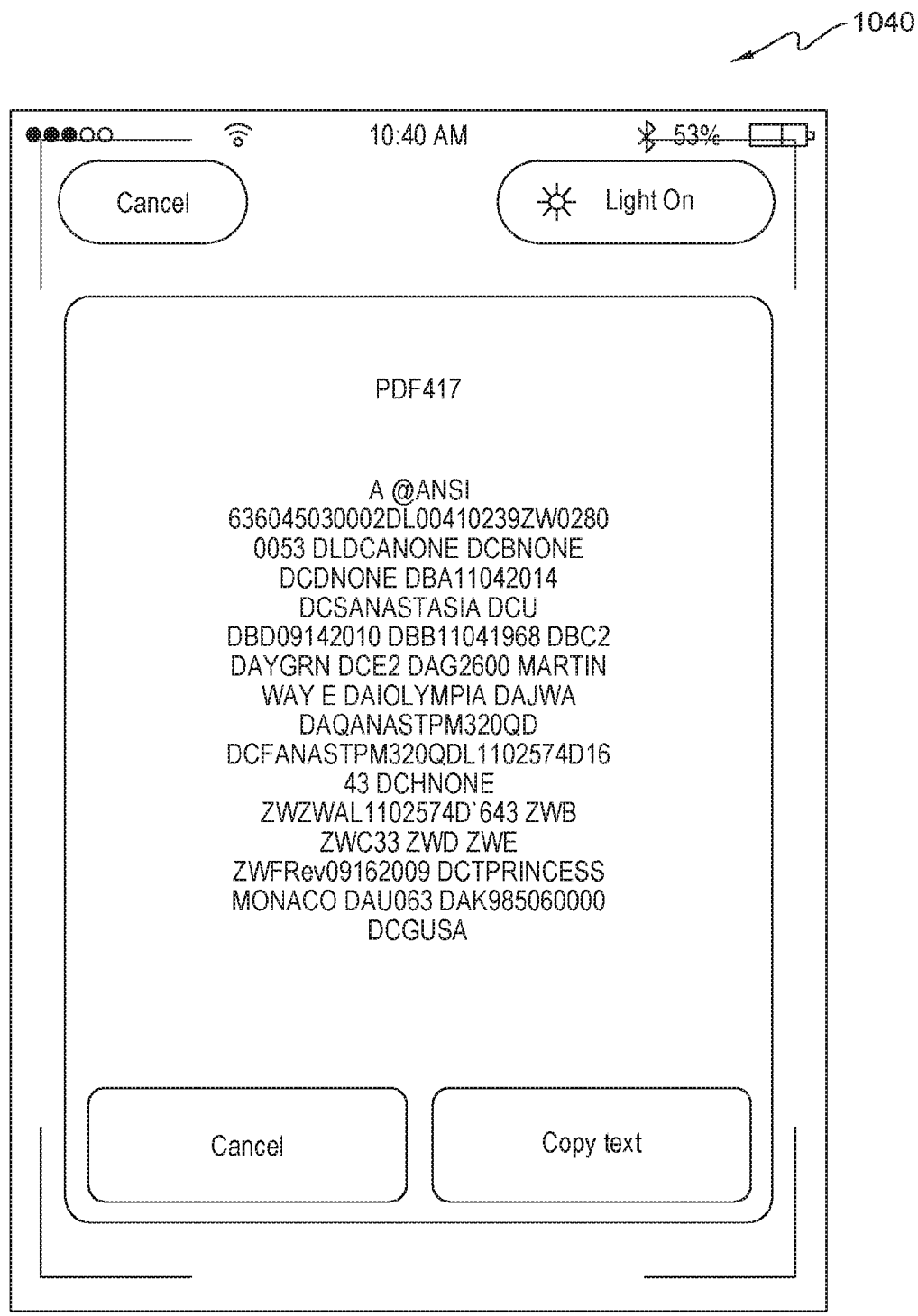

FIG. 10A-10C are example screenshots of security marker generation, manipulation, and output, in accordance with an embodiment of the present invention. Embodiments of the present invention provide solutions for adding security markers to digital cards (i.e., brands). In this embodiment, the digital template management system (e.g., digital template management sub system 102) generates security markers using the design app (e.g., design app 104). For example, the digital template management system can generate a PDF47 two-dimensional barcode which is required as common machine-readable technology for the American Association Motor Vehicle Administrators (AAMVA). The digital template management system also provides QRCode generation and Code 128, a high density barcode as well. These barcodes are created from branding data and are referred to generally as security markers.

FIG. 10A is an example screenshot 1000 in the design app, in accordance with an embodiment of the present invention. Specifically, FIG. 10A shows control option 1002 which denotes the security marker controls. Control option 1002 includes fields 1004a and 1006a. Field 1004a provides a data field for PDF417 bar code generation while field 1006a provides a data field for code 128 bar code generation. In other words, fields 1004a and 1006a provide the sample data field for PDF4714 and code 128 bar code generation.

Display area 1008 displays an image generated to reflect user input (e.g., from control option 1002). In this example, display area 1008 shows the back of a sample digital card. Barcodes 1004b and 1006b correspond to data inputted into fields 1004a and 1006a respectively. In other words, the black of the sample digital card shows the layout of barcodes 1004b and 1006b which are represented with different stipple patterns to indicate what type of barcode they are (e.g., PDF 417 and Code128, respectively).

FIG. 10B is an example screenshot of a sample data 1020 that has been ciphered into a barcode. In this example, data field 1025 has been ciphered into a PDF417 barcode from the AAMVA for jurisdictions of a driver's license.

FIG. 10C IS an example screenshot of an example output 1040 that is generated when a generated barcode is scanned. Specifically, the PDF417 type barcode that the branding app (e.g., design app 104) created for the digital card was scanned (e.g., with an app on a mobile device) and a display of the data contained on scanned digital card is displayed, as shown in this Figure.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

User/subscriber: includes, but is not necessarily limited to, the following: (i) a single individual human; (ii) an artificial intelligence entity with sufficient intelligence to act as a user or subscriber; and/or (iii) a group of related users or subscribers.

Receive/provide/send/input/output/report: unless otherwise explicitly specified, these words should not be taken to imply: (i) any particular degree of directness with respect to the relationship between their objects and subjects; and/or (ii) absence of intermediate components, actions and/or things interposed between their objects and subjects.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method comprising:
    creating a digital card template design using graphical icons in a user interface display, wherein the user interface display enables a user to add respective data fields of the digital card template design and respective security credentials;
    accessing a server to test the created digital card template design using sample data to populate respective data fields of the created digital card template design;
    deploying the published digital card template design to an issuing service;
    preventing unauthorized security credentials to an instance of a digital identification card from being issued by utilizing an acquisition URL; and
    responsive to receiving the acquisition URL from the issuing service, building the instance of the digital identification card from information included in the acquisition URL.

2. The computer-implemented method of claim 1, further comprising:
    testing the created digital card template design on the server using the sample data.

3. The computer-implemented method of claim 2, wherein testing the published digital card template design using the sample data comprises:
    transmitting a request for the acquisition URL that corresponds to information associated with customer information; and
    responsive to receiving the acquisition URL that corresponds to information associated with customer information, creating an image display of the published digital card template design having data field populated with information included in the acquisition URL.

4. The computer-implemented method of claim 1, further comprising:
    transmitting the built instance of the digital identification card to a device associated with a customer; and
    responsive to receiving a request to revoke security credentials associated with the digital identification card stored on the device, revoke security credentials associated with the digital identification card stored on the device.

5. The computer-implemented method of claim 1, wherein publishing the created digital card template design comprises:
    saving the created digital card template design as a version.

6. The computer-implemented method of claim 5, further comprising:
    responsive to saving the version of the created digital card template design, saving a copy of the saved version of the created digital card template design in a repository; and indexing instances of the saved copy of the saved version of the created digital card template design to provide multiple versions of the saved copy.

7. The computer-implemented method of claim 6, further comprising:
responsive to receiving a request of an instance of the saved copy of the saved version of the created digital card template design, providing the saved copy.

8. The computer-implemented method of claim 1, wherein the acquisition URL includes identification information for one or more data fields of the digital card template design.

9. The computer-implemented method of claim 1, wherein responsive to receiving the acquisition URL from the issuing service, building the instance of the digital identification card comprises:
selecting the digital card template design based on the information included in the acquisition URL; and
binding customer information included in the acquisition URL to respective data fields of the digital card template design.

10. The computer-implemented method of claim 1, further comprising:
providing management capability of the deployed digital card template design to more than one user of a production chain.

11. A computer program product comprising:
one or more computer readable storage media and program instructions stored on the one or more computer readable storage media, the program instructions comprising:
program instructions to create a digital card template design using graphical icons in a user interface display, wherein the user interface display enables a user to add respective data fields of the digital card template design and respective security credentials;
program instructions to access a server to test the created digital card template design using sample data to populate respective data fields of the created digital card template design;
program instructions to deploy the published digital card template design to an issuing service;
program instructions to prevent unauthorized security credentials to an instance of a digital identification card from being issued by utilizing an acquisition URL; and
program instructions to, responsive to receiving the acquisition URL from the issuing service, building the instance of the digital identification card from information included in the acquisition URL.

12. The computer program product of claim 11, wherein the program instructions stored on the one or more computer readable storage media further comprise:
program instructions to test the created digital card template design on the server using the sample data.

13. The computer program product of claim 11, wherein the program instructions stored on the one or more computer readable storage media further comprise:
program instructions to transmit the built instance of the digital identification card to a device associated with a customer; and
responsive to receiving a request to revoke security credentials associated with the digital identification card stored on the device, revoke security credentials associated with the digital identification card stored on the device.

14. The computer program product of claim 11, wherein the program instructions to publish the created digital card template design comprise:
program instructions to save the created digital card template design as a version.

15. The computer program product of claim 14, wherein the program instructions stored on the one or more computer readable storage media further comprise:
program instructions to, responsive to saving the version of the created digital card template design, save a copy of the saved version of the created digital card template design in a repository; and
program instructions to index instances of the saved copy of the saved version of the created digital card template design to provide multiple versions of the saved copy.

16. A computer system comprising:
one or more computer processors;
one or more computer readable storage media; and
program instructions stored on the one or more computer readable storage media for execution by at least one of the one or more computer processors, the program instructions comprising:
program instructions to create a digital card template design using graphical icons in a user interface display, wherein the user interface display enables a user to add respective data fields of the digital card template design and respective security credentials;
program instructions to access a server to test the created digital card template design using sample data to populate respective data fields of the created digital card template design;
program instructions to deploy the published digital card template design to an issuing service;
program instructions to prevent unauthorized security credentials to an instance of a digital identification card from being issued by utilizing an acquisition URL; and
program instructions to, responsive to receiving the acquisition URL from the issuing service, building the instance of the digital identification card from information included in the acquisition URL.

17. The computer system of claim 16, wherein the program instructions stored on the one or more computer readable storage media further comprise:
program instructions to test the created digital card template design on the server using the sample data.

18. The computer system of claim 16, wherein the program instructions stored on the one or more computer readable storage media further comprise:
program instructions to transmit the built instance of the digital identification card to a device associated with a customer; and
responsive to receiving a request to revoke security credentials associated with the digital identification card stored on the device, revoke security credentials associated with the digital identification card stored on the device.

19. The computer system of claim 16, wherein the program instructions to publish the created digital card template design comprise:
program instructions to save the created digital card template design as a version.

20. The computer system of claim 19, wherein the program instructions stored on the one or more computer readable storage media further comprise:

program instructions to, responsive to saving the version of the created digital card template design, save a copy of the saved version of the created digital card template design in a repository; and program instructions to index instances of the saved copy of the saved version of the created digital card template design to provide multiple versions of the saved copy.

\* \* \* \* \*